(12) United States Patent
Xu et al.

(10) Patent No.: US 12,309,733 B2
(45) Date of Patent: May 20, 2025

(54) SIGNAL SENDING AND PROCESSING METHOD AND APPARATUS

(71) Applicant: HUAWEI TECHNOLOGIES CO., LTD., Guangdong (CN)

(72) Inventors: Chenlei Xu, Hangzhou (CN); Jianwei Zhou, Hangzhou (CN); Hejia Luo, Hangzhou (CN); Xiaolu Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 388 days.

(21) Appl. No.: 17/707,568

(22) Filed: Mar. 29, 2022

(65) Prior Publication Data

US 2022/0225261 A1    Jul. 14, 2022

Related U.S. Application Data

(63) Continuation of application No. PCT/CN2020/116012, filed on Sep. 17, 2020.

(30) Foreign Application Priority Data

Sep. 30, 2019   (CN) .......................... 201910945860.5

(51) Int. Cl.
*H04W 56/00* (2009.01)
*H04L 5/00* (2006.01)
(Continued)

(52) U.S. Cl.
CPC ....... *H04W 56/0075* (2013.01); *H04L 5/0051* (2013.01); *H04L 25/0224* (2013.01); *H04L 27/2657* (2013.01)

(58) Field of Classification Search
CPC .......... H04W 56/0075; H04W 56/0045; H04L 5/0051; H04L 25/0224; H04L 27/2657;
(Continued)

(56) References Cited

U.S. PATENT DOCUMENTS

2013/0028241 A1* 1/2013 Wang .................. H04L 25/0228
                                                                370/336
2018/0069673 A1* 3/2018 Soriaga ................ H04L 5/0048
2018/0123850 A1    5/2018 Zarifi et al.

FOREIGN PATENT DOCUMENTS

CN      104796927 A    7/2015
CN      106034018 A    10/2016
(Continued)

OTHER PUBLICATIONS

Extended European Search Report issued in European Application No. 20872482.3 on Sep. 29, 2022, 9 pages.
Lihui et al., "Power Saving Mechanism in LTE System—Discontinuous Reception," Technology Discussion, May 2013, 7 pages (with English abstract).
Office Action issued in Chinese Application No. 201910945860.5 on Oct. 27, 2021, 16 pages (with English translation).
(Continued)

*Primary Examiner* — Dady Chery
(74) *Attorney, Agent, or Firm* — Fish & Richardson P.C.

(57) ABSTRACT

This application discloses example signal sending methods and apparatuses, and example signal processing methods and apparatuses. One example method includes generating, by a terminal device, a channel sounding reference signal (SRS). The terminal device can then send the SRS to a target base station, where the target base station detects, by using the SRS, that a change range of an uplink timing location of the terminal device is not less than a length of one SRS symbol.

18 Claims, 12 Drawing Sheets

(51) Int. Cl.
*H04L 25/02* (2006.01)
*H04L 27/26* (2006.01)
(58) Field of Classification Search
CPC ............. H04L 27/2613; H04L 27/0014; H04L 2027/0026; H04J 11/003; H04B 7/18513
See application file for complete search history.

(56) References Cited

FOREIGN PATENT DOCUMENTS

| | | |
|---|---|---|
| CN | 107801240 A | 3/2018 |
| WO | 2015053590 A1 | 4/2015 |
| WO | 2018031770 A1 | 2/2018 |

OTHER PUBLICATIONS

PCT International Search Report and Written Opinion issued in International Application No. PCT/CN2020/116012 on Dec. 18, 2020, 13 pages (with English translation).
Qualcomm Inc., "SRS capacity enhancements," 3GPP TSG-RAN WG1 #82, R1-153881, Beijing, China, Aug. 24-28, 2015, 4 pages.
ZTE, ZTE Microelectronics, "Discussion on SRS design for NR," 3GPP TSG RAN WG1 Meeting #88, R1-1701818, Athens, Greece, Feb. 13-17, 2017, 3 pages.
ZTE Microelectronics Technology, Nubia Technology, "Discussion on SRS design for eLAA UL," 3GPP TSG RAN WG1 Meeting #84bis, R1-162324, Busan, Korea Apr. 11-15, 2016, 4 pages.

* cited by examiner

```
SRS-Config ::=                    SEQUENCE {
    srs-ResourceSetToReleaseList      SEQUENCE (SIZE (1..maxNrofSRS-ResourceSets))
        OF SRS-ResourceSetId      OPTIONAL,   -- Need N
    srs-ResourceSetToAddModList       SEQUENCE (SIZE (1..maxNrofSRS-ResourceSets))
        OF SRS-ResourceSet        OPTIONAL,   -- Need N
    srs-ResourceToReleaseList         SEQUENCE (SIZE (1..maxNrofSRS-Resources)) OF
        SRS-ResourceId            OPTIONAL,   -- Need N
    srs-ResourceToAddModList          SEQUENCE (SIZE (1..maxNrofSRS-Resource)) OF
        SRS-Resource              OPTIONAL,   -- Need N
    tpc-Accumulation                  ENUMERATED {disabled}
        OPTIONAL,    -- Need S
    srs-SubcarrierSpacing             ENUMERATED {kHz15, kHz30, kHz60, kHz120}
    ...
}
```

FIG. 11

```
    srs-ResourceId              SRS-ResourceId,
    nrofSRS-Ports               ENUMERATED {port1, ports2, ports4},
    ptrs-PortIndex              ENUMERATED {n0, n1 }
OPTIONAL,    -- Need R
    transmissionComb            CHOICE {
        n1                          SEQUENCE {
            combOffset-n1                   INTEGER (0),
            cyclicShift-n1                  INTEGER (0..3)
        },
        n2                          SEQUENCE {
            combOffset-n2                   INTEGER (0..1),
            cyclicShift-n2                  INTEGER (0..7)
        },
        n4                          SEQUENCE {
            combOffset-n4                   INTEGER (0..3),
            cyclicShift-n4                  INTEGER (0..11)

}
    },
    ...
}
```

SIGNAL SENDING AND PROCESSING METHOD AND APPARATUS

CROSS-REFERENCE TO RELATED APPLICATIONS

This application is a continuation of International Application No. PCT/CN2020/116012, filed on Sep. 17, 2020, which claims priority to Chinese Patent Application No. 201910945860.5, filed on Sep. 30, 2019. The disclosures of the aforementioned applications are hereby incorporated by reference in their entireties.

TECHNICAL FIELD

This application relates to the terminal field, and in particular, to a signal sending and processing method and apparatus.

BACKGROUND

The future 5G and its evolved network need to not only meet service requirements of various industries, but also provide wider service coverage. Compared with terrestrial cellular mobile communication, satellite mobile communication has huge advantages. The satellite mobile communication has a long communication distance, large coverage, and a wide communication frequency bandwidth, and can provide users with communication services at any time and any place. Therefore, satellite mobile communication has very broad application prospect, and has unique advantages especially in aspects such as international and domestic communication, and emergency response and disaster relief.

Based on orbital altitudes of satellites, satellite mobile communication systems may be classified into a geostationary earth orbit (Geostationary Earth Orbit, GEO) system, a medium earth orbit (Medium Earth Orbit, MEO) satellite communication system, and a low earth orbit (Low Earth Orbit, LEO) satellite communication system.

Regardless of whether a terrestrial cellular mobile communication system or a satellite mobile communication system is used, to implement normal communication between a base station and a terminal, downlink and uplink synchronization signals first need to be used to separately perform initial timing and frequency offset estimation on a terminal side and a base station side, so that the terminal can successfully access a network. During network connection, the base station and the terminal also need to continuously track timing and frequency offset changes to ensure uplink and downlink synchronization and correct transmission of communication data.

To maintain normal communication in a network connection phase, the base station and the terminal need to track changes of an uplink timing location and an uplink frequency offset. Uplink data, control information, and demodulation reference signal (DeModulation Reference Signal, DMRS) may be used to estimate an uplink timing advance and a residual frequency offset value of a specific terminal. However, transmission of the uplink data, the control information, and the demodulation reference signal of the specific terminal is scheduled based on the base station, and a case in which no uplink data of the terminal is transmitted within a period of time may occur. A channel sounding reference signal (Sounding Reference Signal, SRS) is mainly used for uplink channel quality estimation and related parameter measurement. The signal does not necessarily need to be transmitted together with the uplink data and the control information. Therefore, the SRS may be used to track and estimate an uplink timing location and a frequency offset of the specific terminal.

In the satellite mobile communication system, a terminal without a global navigation satellite system (Global Navigation Satellite System, GNSS) positioning capability needs to track the uplink timing location and the frequency offset in a manner of closed-loop measurement, that is, the terminal sends a signal, and the base station measures the signal and feeds back a measurement result to the terminal. When a closed-loop measurement method is used, the specific terminal may send an SRS on a specific time-frequency resource. After receiving the SRS, the base station can obtain information about changes of the uplink timing location and the frequency offset of the terminal.

Compared with the terrestrial cellular mobile communication system, the satellite communication system has a higher frequency offset change rate and a higher timing point change rate. For the frequency offset change rate, it is assumed that a low-orbit satellite system with a satellite orbital height of 600 km has a maximum Doppler frequency offset change rate of about 0.25 ppm/s, that is, an equivalent frequency offset change rate is 0.5 kHz/s when a carrier frequency is 2 GHz, and the equivalent frequency offset change rate is 7.5 kHz/s when the carrier frequency is 30 GHz. Therefore, a subcarrier spacing of a low frequency band or a high frequency band (a minimum subcarrier width of the low frequency band is 15 kHz and a minimum subcarrier width of the high frequency band is 60 kHz) can resist this degree of Doppler frequency offset, and it is not necessary to make a special design for the SRS on a basis of an existing protocol. For the timing point change rate, it is assumed that in the foregoing low-orbit satellite system with the satellite orbital height of 600 km, a round-trip transmission delay change rate of a terminal located at a minimum elevation angle is about ±45 μs/s, and a difference between round-trip transmission delay change rates of terminals located at two ends of a coverage area of a satellite with a radius of 100 km is 10 μs/s. An SRS structure specified in the existing protocol may be unable to implement an uplink timing tracking function under all conditions.

SUMMARY

Embodiments of this application provide a signal sending method and apparatus, and a signal processing method and apparatus. By using solutions in the embodiments of this application, an SRS symbol length and a detectable change range of an uplink timing location can be effectively increased, and a tracking effect on an uplink timing location and a frequency offset of a terminal device can be improved.

According to a first aspect, an embodiment of this application provides a signal sending method, including:
generating a channel sounding reference signal SRS; and
sending the SRS to a target base station, where the target base station can detect, by using the received SRS, that a change range of an uplink timing location of a terminal device that sends the SRS is not less than a length of one SRS symbol.

Optionally, the SRS is obtained by performing time domain mapping on a masked SRS frequency domain sequence.

Optionally, the method further includes generating the masked SRS frequency domain sequence, which specifically includes:

multiplying an SRS frequency domain sequence by a mask sequence, to generate the masked SRS frequency domain sequence.

Optionally, the multiplying an SRS frequency domain sequence by a mask sequence includes multiplying one piece of frequency domain data $\tilde{r}_{u,v}^{(\alpha,\delta)}(n)$ in one SRS frequency domain sequence by one element c(n) of the mask sequence, and corresponding formulas are as follows:

$$\tilde{r}_{u,v}^{(\alpha,\delta)}(n) = e^{j\alpha n}\bar{r}_{u,v}(n), 0 \le n < M_{ZC}$$

$$r_{u,v}^{(\alpha,\delta)}(n) = c(n) \cdot \tilde{r}_{u,v}^{(\alpha,\delta)}(n), 0 \le n < M_{ZC}$$

where $r_{u,v}^{(\alpha,\delta)}(n)$ represents one piece of frequency domain data in the masked SRS frequency domain sequence, and $M_{ZC}$ is a length of the SRS frequency domain sequence.

Optionally, before the generating a channel sounding reference signal SRS, the method further includes:

obtaining a preset masking form, and determining, based on the preset masking form, a location for masking in the SRS frequency domain sequence.

Optionally, the obtaining a preset masking form includes:

obtaining an index number, and reading a masking form retrieval table based on the index number, where the masking form retrieval table includes index numbers and masking forms corresponding to the index numbers; and determining the preset masking form based on a reading result.

Optionally, the mask sequence is a first mask sequence generated based on a base station related parameter and a first SRS related parameter, and the base station related parameter is a related parameter of a satellite cell or a satellite beam corresponding to the target base station.

Optionally, the mask sequence is a second mask sequence generated based on a terminal device related parameter and a first SRS related parameter, and the terminal device related parameter includes a cell radio network temporary identifier of the terminal device.

Optionally, the mask sequence is a third mask sequence generated based on a first SRS related parameter and a second SRS related parameter, and the second SRS related parameter is used to indicate a time-frequency resource of the SRS.

Optionally, before the generating a channel sounding reference signal SRS, the method further includes:

obtaining an indication parameter of a target base station to which the terminal device needs to send the SRS, where the indication parameter is used to represent a type of the satellite cell or the satellite beam corresponding to the target base station; and determining that the indication parameter is within an interval of a maskable parameter value.

Optionally, the generating a channel sounding reference signal SRS includes:

obtaining first indication signaling indicating a subcarrier width of the SRS; and generating the SRS based on the first indication signaling.

Optionally, the generating a channel sounding reference signal SRS includes:

obtaining second indication signaling related to a sending structure that can be supported by the SRS, where the second indication signaling is used to indicate that the sending structure that can be supported by the SRS includes a comb structure and a non-comb structure; and generating the SRS based on the second indication signaling.

According to a second aspect, an embodiment of this application provides a signal processing method, including:

receiving an SRS sent by a terminal device; and tracking an uplink timing location of the terminal device based on the SRS, where a change range of the uplink timing location is not less than a length of one SRS symbol.

Optionally, the SRS is obtained by performing time domain mapping on a masked SRS frequency domain sequence. The tracking an uplink timing location of the terminal device based on the SRS includes:

obtaining a mask sequence corresponding to the SRS, and decoding the masked SRS frequency domain sequence based on the mask sequence to obtain frequency domain data in the SRS; and tracking the uplink timing location of the terminal device based on the frequency domain data.

Optionally, before the obtaining a mask sequence corresponding to the SRS, the method further includes:

obtaining a preset masking form, and determining, based on the preset masking form, a location for decoding the SRS.

Optionally, before the receiving an SRS sent by a terminal device, the method further includes:

sending first indication signaling to the terminal device, where the first indication signaling is used to indicate a subcarrier width of the SRS.

Optionally, before the receiving an SRS sent by a terminal device, the method further includes:

sending second indication signaling to the terminal device, where the second indication signaling is used to indicate that a sending structure that can be supported by the SRS includes a comb structure and a non-comb structure.

According to a third aspect, an embodiment of this application provides a signal sending apparatus, where the apparatus includes:

a processing unit, generating a channel sounding reference signal SRS; and an output unit, sending the SRS to a target base station, where the target base station can detect, by using the received SRS, that a change range of an uplink timing location of a terminal device that sends the SRS is not less than a length of one SRS symbol.

Optionally, the SRS is obtained by performing time domain mapping on a masked SRS frequency domain sequence.

Optionally, the apparatus includes a generation unit, configured to generate the masked SRS frequency domain sequence, and the generation unit is specifically configured to:

multiply an SRS frequency domain sequence by a mask sequence, to generate the masked SRS frequency domain sequence.

Optionally, the multiplying an SRS frequency domain sequence by a mask sequence includes multiplying one piece of frequency domain data $\tilde{r}_{u,v}^{(\alpha,\delta)}(n)$ in one SRS frequency domain sequence by one element c(n) of the mask sequence, and corresponding formulas are as follows:

$$\tilde{r}_{u,v}^{(\alpha,\delta)}(n) = e^{j\alpha n}\bar{r}_{u,v}(n), 0 \le n < M_{ZC}$$

$$r_{u,v}^{(\alpha,\delta)}(n) = c(n) \cdot \tilde{r}_{u,v}^{(\alpha,\delta)}(n), 0 \le n < M_{ZC}$$

where $r_{u,v}^{(\alpha,\delta)}(n)$ represents one piece of frequency domain data in the masked SRS frequency domain sequence, and $M_{ZC}$ is a length of the SRS frequency domain sequence.

Optionally, the apparatus further includes a preset unit, configured to:

before the channel sounding reference signal SRS is generated, obtain a preset masking form, and determine, based on the preset masking form, a location for masking in the SRS frequency domain sequence.

Optionally, the obtaining a preset masking form includes:

obtaining an index number, and reading a masking form retrieval table based on the index number, where the masking form retrieval table includes index numbers and masking forms corresponding to the index numbers; and determining the preset masking form based on a reading result.

Optionally, the mask sequence is a first mask sequence generated based on a base station related parameter and a first SRS related parameter, and the base station related parameter is a related parameter of a satellite cell or a satellite beam corresponding to the target base station.

Optionally, the mask sequence is a second mask sequence generated based on a terminal device related parameter and a first SRS related parameter, and the terminal device related parameter includes a cell radio network temporary identifier of the terminal device.

Optionally, the mask sequence is a third mask sequence generated based on a first SRS related parameter and a second SRS related parameter, and the second SRS related parameter is used to indicate a time-frequency resource of the SRS.

Optionally, the apparatus further includes an indication unit, configured to:

before the channel sounding reference signal SRS is generated, obtain an indication parameter of a target base station to which the terminal device needs to send the SRS, where the indication parameter is used to represent a type of a satellite cell or a satellite beam corresponding to the target base station; and determine that the indication parameter is within an interval of a maskable parameter value.

Optionally, in terms of generating the channel sounding reference signal SRS, the apparatus is specifically configured to:

obtain first indication signaling indicating a subcarrier width of the SRS; and generate the SRS based on the first indication signaling.

Optionally, in terms of generating the channel sounding reference signal SRS, the apparatus is specifically configured to:

obtain second indication signaling related to a sending structure that can be supported by the SRS, where the second indication signaling is used to indicate that the sending structure that can be supported by the SRS includes a comb structure and a non-comb structure; and generate the SRS based on the second indication signaling.

According to a fourth aspect, an embodiment of this application provides a signal processing apparatus, where the apparatus includes:

a receiving unit, configured to receive an SRS sent by a terminal device; and a tracking unit, configured to track an uplink timing location of the terminal device based on the SRS, where a change range of the uplink timing location is not less than a length of one SRS symbol.

Optionally, the SRS is obtained by performing time domain mapping on a masked SRS frequency domain sequence, and the tracking unit is specifically configured to:

obtain a mask sequence corresponding to the SRS, and decode the masked SRS frequency domain sequence based on the mask sequence to obtain frequency domain data in the SRS; and track the uplink timing location of the terminal device based on the frequency domain data.

Optionally, before obtaining the mask sequence corresponding to the SRS, the tracking unit is further configured to:

obtain a preset masking form, and determine, based on the preset masking form, a location for decoding the SRS.

Optionally, before receiving the SRS sent by the terminal device, the receiving unit is further configured to:

send first indication signaling to the terminal device, where the first indication signaling is used to indicate a subcarrier width of the SRS.

Optionally, before receiving the SRS sent by the terminal device, the receiving unit is further configured to:

send second indication signaling to the terminal device, where the second indication signaling is used to indicate that a sending structure that can be supported by the SRS includes a comb structure and a non-comb structure.

According to a fifth aspect, an embodiment of this application provides a computer-readable storage medium including instructions. When running on a computer, the instructions enable the computer to perform the method according to any one of the first aspect or to perform the method according to any one of the second aspect.

According to a sixth aspect, an embodiment of this application provides a computer program product including computer program code. When running on a computer, the computer program code enables the computer to perform the method according to any one of the first aspect or to perform the method according to any one of the second aspect.

According to a seventh aspect, an embodiment of this application provides a communication apparatus, including: an input interface circuit, a logic circuit, and an output interface circuit. The logic circuit is configured to perform the method according to any one of the first aspect or to perform the method according to any one of the second aspect.

It can be learned that, in the solutions in the embodiments of this application, first a terminal device generates a channel sounding reference signal SRS, and sends the SRS to a target base station; and the target base station receives the SRS sent by the terminal device, and tracks an uplink timing location of the terminal device based on the SRS, where a change range of the uplink timing location is not less than a length of one SRS symbol. In this process, the generated SRS can effectively increase an SRS symbol length and a detectable change range of the uplink timing location, and improve a tracking effect on the uplink timing location and a frequency offset of the terminal device.

These aspects or other aspects of this application are clearer and more comprehensible in descriptions of the following embodiments.

BRIEF DESCRIPTION OF DRAWINGS

To describe the technical solutions in embodiments of this application or the conventional technology more clearly, the following briefly describes the accompanying drawings used in describing the embodiments.

FIG. 11 is a schematic diagram of indication signaling for setting a subcarrier width according to an embodiment of this application;

DESCRIPTION OF EMBODIMENTS

To make a person skilled in the art better understand the solutions in this application, the following describes the technical solutions in embodiments of this application with reference to the accompanying drawings in the embodiments of this application.

An applicable scenario of an embodiment of this application is first described.

Figure 1:
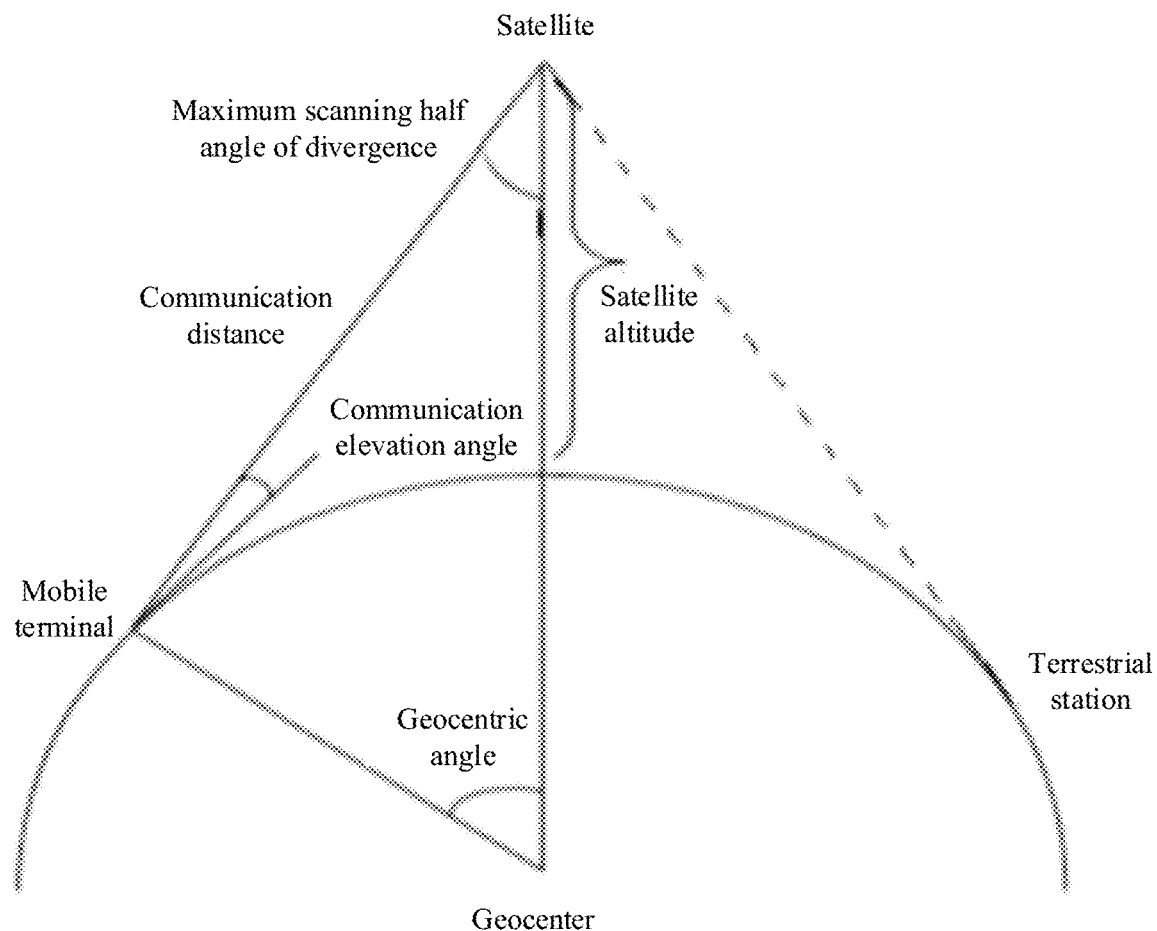
FIG. 1 is a schematic diagram of a satellite communication scenario and architecture according to an embodiment of this application.

FIG. 1 is a schematic diagram of a satellite communication scenario and architecture according to an embodiment of this application. A satellite shown in FIG. 1 has a signal processing capability, or a satellite transparently forwards a signal of a terminal device to a terrestrial station to implement wide area coverage. In this process, a protocol stack compatible with existing 3GPP LTE/NR is used. The terminal device is a common mobile terminal or a dedicated terminal, and a transmission process also follows an LTE/NR protocol. The terminal device may send an SRS on a specific time-frequency resource. After receiving the SRS, a base station can obtain information about changes of an uplink timing location and a frequency offset of the terminal device.

An SRS sequence specified in a conventional LTE/NR protocol is generated in the following manner: In a resource mapping process at a physical layer, a time-frequency location of an SRS frequency domain sequence is determined based on a related configuration parameter, the SRS frequency domain sequence is mapped to a corresponding frequency domain resource, and then a time domain symbol is generated by using inverse fast Fourier transform (Inverse Fast Fourier Transform, IFFT).

The SRS frequency domain sequence is defined as a product of a base sequence $\bar{r}_{u,v}(n)$ and a phase rotation coefficient $e^{j\alpha n}$, where the base sequence multiplies the phase rotation coefficient to achieve a code division multiplexing effect, which is equivalent to a time domain cyclic shift after transformed to time domain, and a specific expression of the SRS frequency domain sequence is as follows:

$$r_{u,v}^{(\alpha,\delta)}(n) = e^{j\alpha n}\bar{r}_{u,v}(n), 0 \leq n < M_{ZC}$$

$r_{u,v}^{(\alpha)}(n)$ is one piece of frequency domain data in the frequency domain sequence, and $M_{ZC} = mN_{sc}^{RB}/2^{\delta}$ is a length of the SRS frequency domain sequence (that is, a quantity of occupied subcarriers); m represents a quantity of resource blocks (Resource Block, RB) occupied by the SRS, with a range of $1 \leq m \leq N_{RB}^{max,UL}$, and $N_{RB}^{max,UL}$ refers to a maximum quantity of uplink RBs in a current bandwidth; $N_{sc}^{RB}$ indicates a quantity of subcarriers occupied by one RB, namely, 12; and a coefficient $\delta$ is calculated by using a formula $\delta = \log_2(K_{TC})$, and $K_{TC}$ is a comb parameter of the SRS, and indicates that the SRS sequence is mapped at an interval of $(K_{TC}-1)$ subcarriers in frequency domain.

In addition, a parameter $\alpha$ is used to represent a cyclic shift of the SRS, and is defined as follows:

$$\alpha = 2\pi \frac{n_{SRS}^{cs,i}}{n_{SRS}^{cs,max}}$$

$n_{SRS}^{cs,i} \in \{0, 1, \ldots, n_{SRS}^{cs,max}-1\}$. When the comb parameter of the SRS $K_{TC}=2$, $n_{SRS}^{cs,max}=8$; and when the comb parameter of the SRS $K_{TC}=4$, $n_{SRS}^{cs,max}=12$.

In addition, a generation manner of the SRS base sequence $\bar{r}_{u,v}(n)$ is determined by a sequence length $M_{ZC}$:

When $M_{ZC}=\{6,12,18,24\}$, the base sequence is a special sequence generated based on quadrature phase shift keying (Quadrature Phase Shift Keying, QPSK), and a formula is as follows:

$$\bar{r}_{u,v}(n) = e^{j\varphi(n)\pi/4}, 0 \leq n \leq M_{ZC}-1$$

where a value of $\varphi(n)$ is defined in a protocol table.

When $M_{ZC}=30$, the generation manner of the base sequence is:

$$\bar{r}_{u,v}(n) = e^{-j\frac{\pi(u+1)(n+1)(n+2)}{31}}, 0 \leq n \leq M_{ZC}-1$$

When $M_{ZC} \geq 36$, the generation manner of the base sequence is:

$$\bar{r}_{u,v}(n) = x_q(n \bmod N_{ZC})$$

$$x_q(m) = e^{-j\frac{\pi qm(m+1)}{N_{ZC}}}$$

$$q = \lfloor \bar{q} + 1/2 \rfloor + v \cdot (-1)^{\lfloor 2\bar{q} \rfloor}$$

where $$\bar{q} = N_{ZC} \cdot (u+1)/31$$

$N_{ZC}$ is a maximum prime number satisfying $N_{ZC} < M_{ZC}$.

When the SRS sequence generated in the foregoing manner is mapped to a corresponding time-frequency resource based on configuration information indicated by the base station, in addition to comb multiplexing of spaced subcarrier mapping and a code division multiplexing form of the time domain cyclic shift, resource utilization is improved in a manner such as time domain multiplexing, frequency domain multiplexing, and symbol multiplexing.

If the SRS uses comb multiplexing, a width of an SRS frequency domain subcarrier is $K_{TC}$ times that of an uplink data subcarrier, a length of an SRS time domain symbol is $1/K_{TC}$ that of an uplink data symbol, and one uplink data symbol is equivalent to including $K_{TC}$ repeated SRS symbols. If the SRS uses code division multiplexing, SRSs that use a same time-frequency resource can multiplex different cyclic shift forms of a same base sequence. Although time-frequency resource utilization is improved in the two multiplexing forms: comb multiplexing and code division multiplexing, an estimable uplink timing location range of an SRS sent at a time interval is also limited, and consequently, an SRS structure specified in a current protocol cannot meet uplink timing location tracking requirements of some satellite communication scenarios.

The SRS may use a code division multiplexing form, that is, SRSs mapped to the same time-frequency resource may multiplex a same base sequence with different cyclic shift values, and a timing location change rate of a satellite communication system is relatively high. Therefore, a change of an uplink timing location within a time interval in which a terminal transmits the SRS twice may exceed a cyclic shift interval, and consequently, the base station cannot distinguish an uplink timing location of the terminal from an uplink timing location of another terminal. Due to a limit of the cyclic shift, a change that is of an uplink timing location within a time interval in which a terminal transmits the SRS twice and that can be distinguished by the base station cannot reach a length of one SRS symbol.

Figure 2:
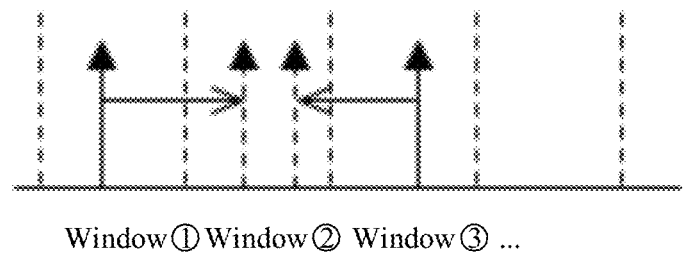
FIG. 2 is a schematic diagram in which a base station cannot distinguish between uplink timing locations of two terminals according to an embodiment of this application.

Specifically, when a difference between round-trip transmission delay change rates (equivalent to uplink timing location change rates) of terminals in one satellite cell (or one satellite beam) is relatively large and a time interval between two times of SRS transmission is relatively long, uplink timing locations that are of two terminals using a same base sequence and different time domain cyclic shift values and that are detected by the base station may fall within a same cyclic shift limitation range. FIG. 2 is a schematic diagram in which a base station cannot distinguish between uplink timing locations of two terminals according to an embodiment of this application. As shown in FIG. 2, at a moment T0, a timing location of a terminal 1 is located in a window □, and a timing location of a terminal 2 is located in a window □. At a moment T1, changed timing locations of the terminal 1 and the terminal 2 are both in a window □. As a result, the base station can hardly distinguish between the timing locations of the two terminals.

Figure 3:
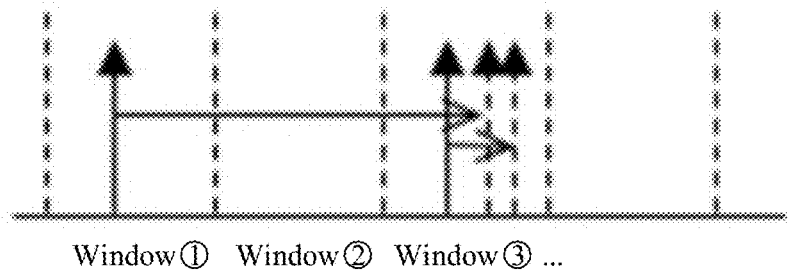
FIG. 3 is another schematic diagram in which a base station cannot distinguish between uplink timing locations of two terminals according to an embodiment of this application.

When a round-trip transmission delay change rate of a terminal in one satellite cell (or one satellite beam) is relatively high and a time interval between two times of SRS transmission is relatively long, an uplink timing location of the terminal that is detected by the base station may occur within a cyclic shift limitation range of another terminal. FIG. 3 is another schematic diagram in which a base station cannot distinguish between uplink timing locations of two terminals according to an embodiment of this application. As shown in FIG. 3, at a moment T0, a timing location of a terminal 1 is located in a window □. At a moment T1, changed timing locations of the terminal 1 and a terminal 2 are both in a window □. As a result, the base station can hardly distinguish between the timing locations of the two terminals.

In consideration of a limitation of a cyclic shift value on timing location estimation, an SRS uses different comb parameters and corresponding cyclic shift values. In different subcarrier conditions, maximum timing location change ranges of different terminals that can be distinguished by the base station are shown in Table 1.

TABLE 1

Maximum timing location change ranges of terminals that can be distinguished by the base station when the terminals use SRSs with different configurations

| Subcarrier (kHz) | Distinguishable maximum timing change range ($K_{TC}=2$, $n_{SRS}^{cs, max}=8$) | Distinguishable maximum timing change range ($K_{TC}=4$, $n_{SRS}^{cs, max}=12$) |
| --- | --- | --- |
| 15 | 4.16 μs | 1.38 μs |
| 30 | 2.08 μs | 0.69 μs |
| 60 | 1.04 μs | 0.35 μs |
| 120 | 0.52 μs | 0.17 μs |

For the scenario described in FIG. 2 (assuming that the difference between the round-trip transmission delay change rates of the two terminals is 10 μs/s) and the scenario described in FIG. 3 (assuming that a round-trip transmission delay change rate of a terminal is 45 μs/s), to avoid exceeding the detectable maximum timing location change range described in Table 1, upper limits of SRS transmission periods of terminals required by the base station are shown in Table 2.

TABLE 2

Upper limits of SRS transmission periods of terminals required by the base station

| Subcarrier (kHz) | Scenario 1 | | Scenario 2 | |
| --- | --- | --- | --- | --- |
| | Maximum transmission period ($K_{TC}=2$) | Maximum transmission period ($K_{TC}=4$) | Maximum transmission period ($K_{TC}=2$) | Maximum transmission period ($K_{TC}=4$) |
| 15 | 416 ms | 138 ms | 92.4 ms | 30.9 ms |
| 30 | 208 ms | 69 ms | 46.2 ms | 15.4 ms |
| 60 | 104 ms | 35 ms | 23.1 ms | 7.7 ms |
| 120 | 52 ms | 17 ms | 11.6 ms | 3.9 ms |

To meet a requirement of uplink timing tracking of each condition in Table 2, the SRS needs to be frequently sent in a relatively small period, which causes relatively large resource overheads.

In addition, the SRS may use a comb multiplexing form, that is, a width of an SRS frequency domain subcarrier is greater than a width of an uplink data subcarrier, and a length of an SRS time domain symbol is shorter than a length of an uplink data symbol. When a timing location change rate of a satellite communication system is relatively high, a change of an uplink timing location in a time interval in which a terminal transmits the SRS twice may exceed one SRS symbol. In this case, when the base station detects the uplink timing location, there may be timing point detection ambiguity at an interval of an SRS symbol.

A round-trip transmission delay change rate of a terminal located at a minimum elevation angle in a satellite coverage area is relatively high. Assuming that the round-trip transmission delay change rate of the terminal is 45 µs/s, if the SRS is sent with a period of 320 ms, and a change of an uplink timing location in a time interval between two times of SRS transmission is 14.4 µs, the current SRS cannot support uplink timing location detection of conditions indicated by underlines in Table 3.

TABLE 3

SRS symbol lengths of different configurations

| Subcarrier (kHz) | SRS symbol length ($K_{TC} = 2$) | SRS symbol length ($K_{TC} = 4$) |
| --- | --- | --- |
| 15 | 33.33 µs | 16.67 µs |
| 30 | 16.67 µs | 8.33 µs |
| 60 | 8.33 µs | 4.16 µs |
| 120 | 4.16 µs | 2.08 µs |

Because an uplink timing location change rate of a satellite communication system, especially a low-orbit satellite communication system, is relatively high, a base station side cannot use a conventional SRS structure to detect a change of an uplink timing location of lengths of one or more SRS symbols, and not uplink timing tracking requirements of all scenarios can be met. Therefore, it is necessary to enhance an SRS design. When a change of an uplink timing location of a terminal is lengths of one or more existing SRS symbols, the base station can distinguish between uplink timing locations of different terminals that send enhanced SRS sequences, to meet an uplink timing tracking requirement of the satellite communication system.

Figure 4:
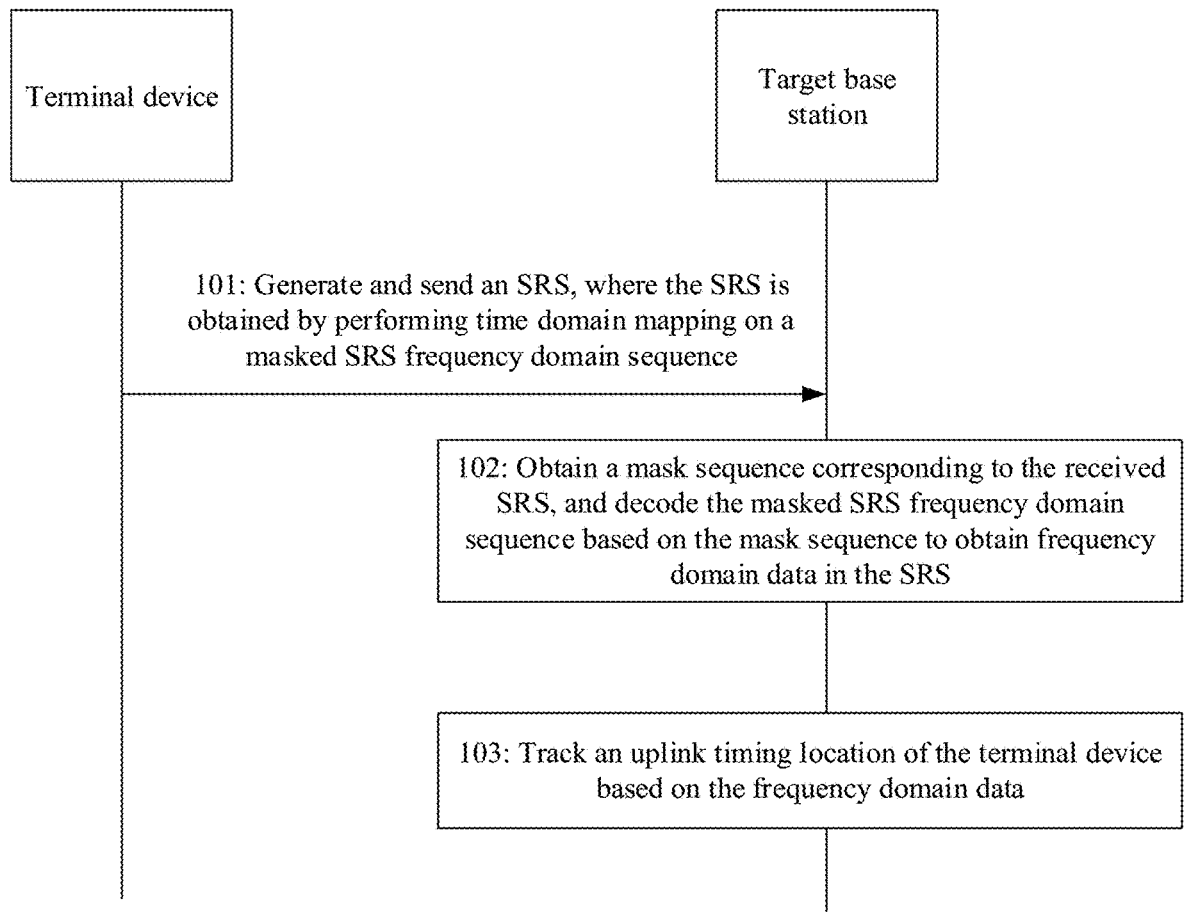
FIG. 4 is a schematic flowchart of a signal sending and processing method according to an embodiment of this application.

Based on the foregoing description, refer to FIG. 4. FIG. 4 is a schematic flowchart of a signal sending and processing method according to an embodiment of this application. As shown in FIG. 4, the method specifically includes the following steps:

101: A terminal device generates a channel sounding reference signal SRS, and sends the SRS to a target base station, where the SRS is obtained by performing time domain mapping on a masked SRS frequency domain sequence.

A conventional generation manner of an SRS frequency domain sequence is:

$$r_{u,v}^{(\alpha,\delta)}(n) = e^{j\alpha n}\bar{r}_{u,v}(n), 0 \le n < M_{ZC}$$

$e^{j\alpha n}$ is a phase rotation coefficient. A base sequence $\bar{r}_{u,v}(n)$ multiplies the phase rotation coefficient to achieve a code division multiplexing effect. Frequency domain phase rotation is equivalent to a time domain cyclic shift. A parameter $\alpha = 2\pi(n_{SRS}^{cs,i}/n_{SRS}^{cs,max})$ is used to represent a cyclic shift of the SRS. $M_{ZC}$ is a length of the SRS frequency domain sequence.

Because each terminal in a network connection phase sends an SRS to a base station at a specific density, time-frequency resource overheads of the SRS are very high. To minimize resource overheads, a code division multiplexing form of an SRS is introduced, and a change range of an uplink timing location of each terminal that the SRS can tolerate is $(1/n_{SRS}^{cs,max})$ SRS symbols. Generally, a relatively high timing location change rate exists in a satellite communication system. Because of a limitation of a cyclic shift, code division multiplexing may cause a base station to be unable to distinguish between different terminals that use SRS sequences generated by different cyclic shifts of a same base sequence and that transmit SRSs on a same time-frequency resource.

Figure 5:
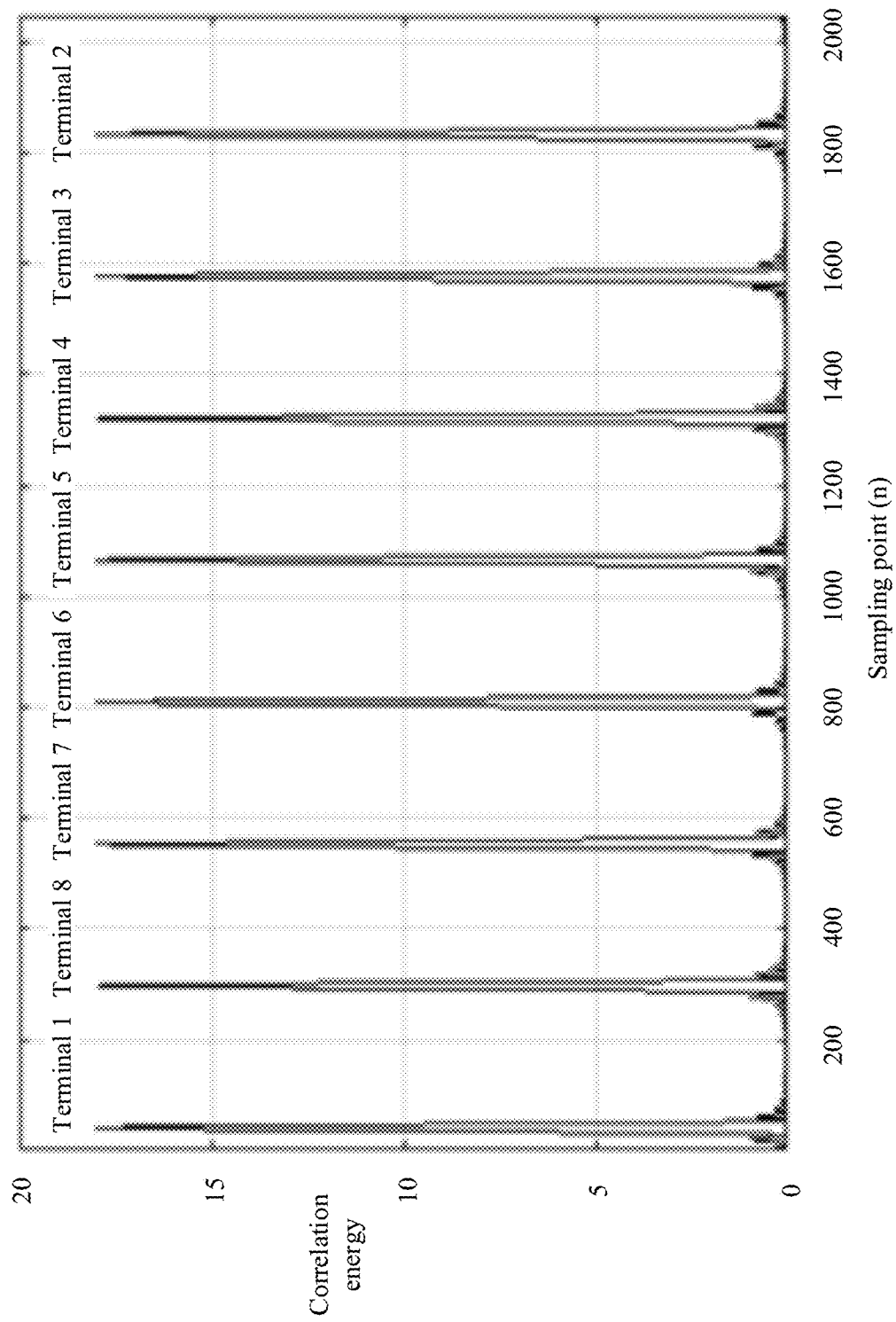
FIG. 5 is a schematic diagram of a multi-user uplink timing location detection result of a conventional SRS according to an embodiment of this application.
Figure 6:
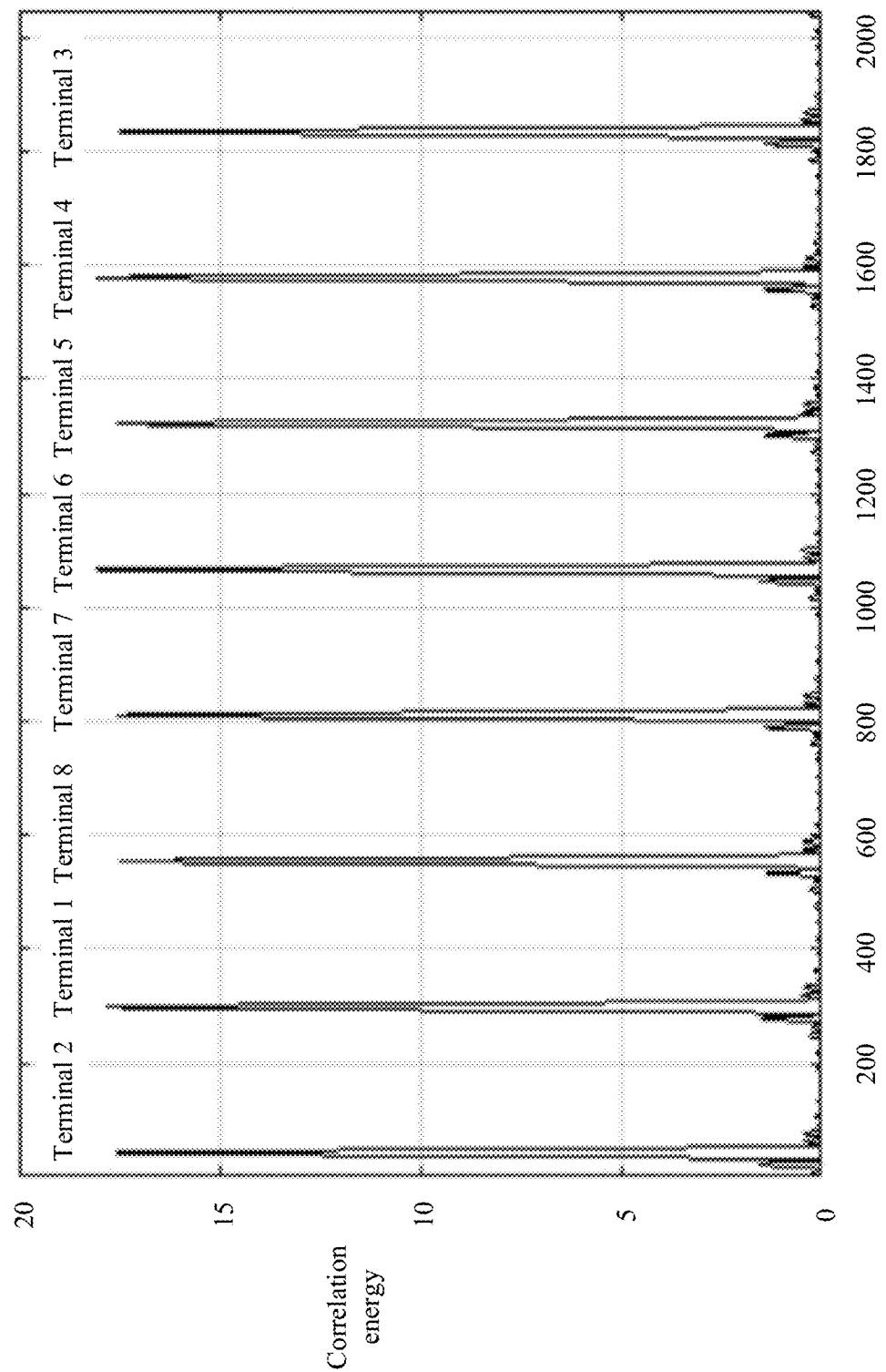
FIG. 6 is another schematic diagram of a multi-user uplink timing location detection result of a conventional SRS according to an embodiment of this application.

A specific example is given to describe the case that because of the limitation of the cyclic shift, code division multiplexing causes the base station to be unable to distinguish between different terminals that transmit, on a same time-frequency resource, SRS sequences generated by different cyclic shifts of a same base sequence. It is assumed that a terminal 1 to a terminal 8 transmit, on a same time-frequency resource, SRSs generated by different cyclic shifts of a same base sequence, comb parameters of all the terminals are 2, and cyclic shift parameters α used by the terminal 1 to the terminal 8 are successively {0, 2π/8, 2π·2/8, 2π·3/8, 2π·4/8, 2π·5/8, 2π·6/8, 2π·7/8}. FIG. 5 is a schematic diagram of a multi-user uplink timing location detection result of a conventional SRS according to an embodiment of this application. At a moment T0, SRSs sent by terminals simultaneously arrive at a base station, and peak locations of the terminals that are detected by the base station are shown in FIG. 5. It should be noted that a peak location corresponding to each terminal timing point is manually marked for convenience of illustration, and the base station can actually detect only eight energy peaks. FIG. 6 is another schematic diagram of a multi-user uplink timing location detection result of a conventional SRS according to an embodiment of this application. At a moment T1, SRSs sent by terminals for the second time also simultaneously arrive at a base station, and peak locations of the terminals that are detected by the base station are shown in FIG. 6. In this case, an uplink timing location of each terminal has already changed, to be specific, the uplink timing location of each terminal is delayed by a length of one cyclic shift, but from the perspective of the base station, locations of eight energy peaks in FIG. 6 are almost the same as those in FIG. 5. In this case, the base station cannot distinguish between changes of timing points of the terminals.

In view of this, an SRS frequency domain sequence generated by the terminal device in this embodiment of this application is a masked SRS frequency domain sequence. Specifically, a mask is a sequence of binary code for performing an exclusive OR operation on a target field to shield a current input bit, and a mask sequence is a sequence including a plurality of mask elements. A main function of the mask sequence is to enable the base station to distinguish between different terminal devices that use different cyclic shifts of a same base sequence as SRS sequences and that transmit SRSs on a same time-frequency resource. A masked SRS sequence is masked in frequency domain, so that a change range of an uplink timing location of each terminal that the base station can detect is extended to one SRS symbol.

After generating the masked SRS frequency domain sequence, the terminal maps the masked SRS frequency domain sequence to a corresponding time-frequency resource based on a related parameter delivered by the target base station, then generates a time domain symbol, namely, a final SRS, by using inverse fast Fourier transform (Inverse Fast Fourier Transform, IFFT), and sends the SRS to the target base station. The target base station is a base station that communicates with the terminal device.

When the SRS frequency domain sequence is masked, frequency domain data is multiplied by the mask sequence to change a frequency domain data phase. The SRS frequency domain sequence is multiplied by a mask in a plurality of forms: For example, a real part and an imaginary part of SRS frequency domain data may be multiplied by two different elements c(2n) and c(2n+1) of the mask sequence respectively, or one piece of SRS frequency domain data as a whole is multiplied by one element c(n) of the mask sequence, or N pieces of SRS frequency domain data as a whole are multiplied by one element c(n) of the mask sequence.

One piece of frequency domain data $\tilde{r}_{u,v}^{(\alpha,\delta)}(n)$ of an SRS frequency domain sequence is multiplied by one element c(n) of the mask sequence, and corresponding formulas are as follows:

$$\tilde{r}_{u,v}^{(\alpha,\delta)}(n)=e^{j\alpha n}\bar{r}_{u,v}(n), 0 \le n < M_{ZC}$$

$$r_{u,v}^{(\alpha,\delta)}(n)=c(n)\cdot\tilde{r}_{u,v}^{(\alpha,\delta)}(n), 0 \le n < M_{ZC}$$

where $r_{u,v}^{(\alpha,\delta)}(n)$ represents one piece of frequency domain data in the masked SRS frequency domain sequence, and $M_{ZC}$ is a length of the SRS frequency domain sequence.

When a mask is selected, a sequence with relatively good autocorrelation and cross-correlation needs to be selected as a mask sequence based on considerations of performance optimization and inter-user interference reduction. A common pseudo-random sequence form such as an m sequence, an M sequence, and a Gold sequence may be selected for the mask sequence. An element in the mask sequence is 1, −1 or a scaled value of 1 or −1.

The mask sequence may be a common sequence for all networks. For example, eight cyclic shift values corresponding to an SRS comb parameter 2 and 12 cyclic shift values corresponding to a comb parameter 4 all have corresponding fixed mask sequences. The mask sequence is only related to a comb parameter and a corresponding cyclic shift value, and all base stations and terminals agree to use a mask sequence that includes a same element. The mask sequence may be a common sequence in one satellite cell (or one satellite beam), generation of the sequence is related to at least one satellite cell (or satellite beam) specific parameter, a comb parameter, and a corresponding cyclic shift value, and the satellite cell (or satellite beam) specific parameter may be a satellite cell (or satellite beam) index number, a bandwidth part (Bandwidth Part, BWP) index number, a synchronization signal block (Synchronization Signal Block, SSB) index number, or the like. The mask sequence may be a terminal-specific sequence, generation of the sequence is related to at least one terminal-specific parameter, a comb parameter, and a corresponding cyclic shift value, and the terminal-specific parameter may be, for example, a cell radio network temporary identifier (Cell-Radio Network Temporary Identifier, C-RNTI) of the terminal. The mask sequence may alternatively be a sequence related to a time-frequency resource to which the SRS is mapped, generation of the sequence is related to at least one SRS time-frequency resource related parameter, a comb parameter, and a corresponding cyclic shift value, and the SRS time-frequency resource parameter includes a symbol index, a timeslot number index, a frequency domain resource index, and the like that are of the time-frequency resource.

An example is used to describe a masked SRS frequency domain sequence and a generation form of a mask thereof. A 31-level Gold sequence is used as an example to generate a mask sequence c(n).

$$c(n)=1-2\tilde{c}(n)$$

$$\tilde{c}(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$

$N_C=1600$, $x_1(0)=1$, $x_1(n)=0$, $n=1, 2, \ldots, 30$; $x_2(n)$ is an m sequence, and a seed for generating the m sequence is:

$$c_{init}=\Sigma_{i=0}^{30}x_2(i)\cdot 2^i$$

The mask sequence is a sequence related to a satellite cell (or satellite beam) index number, a comb parameter, and a corresponding cyclic shift value. A seed of the m sequence that composes the mask sequence is obtained by using a satellite cell (or satellite beam) index number and a cyclic shift parameter of the SRS based on a specific operation rule. A generation manner of the seed of the m sequence is as follows:

$$c_{init}=n_{ID}^{cell}\cdot 2^{15}+n_{SRS}^{cs,j}$$

The mask sequence c(n) is generated by using the seed and a Gold sequence generation rule. A terminal side and a base station side agree to multiply one piece of SRS frequency domain data as a whole by one element c(n) of the mask sequence, and a length of the generated mask sequence is at least $M_{ZC}$. After the SRS frequency domain sequence is masked, the SRS frequency domain sequence is mapped to a corresponding subcarrier of an SRS time-frequency resource, and the terminal side generates finally sent time domain data by using IFFT.

Figure 7:
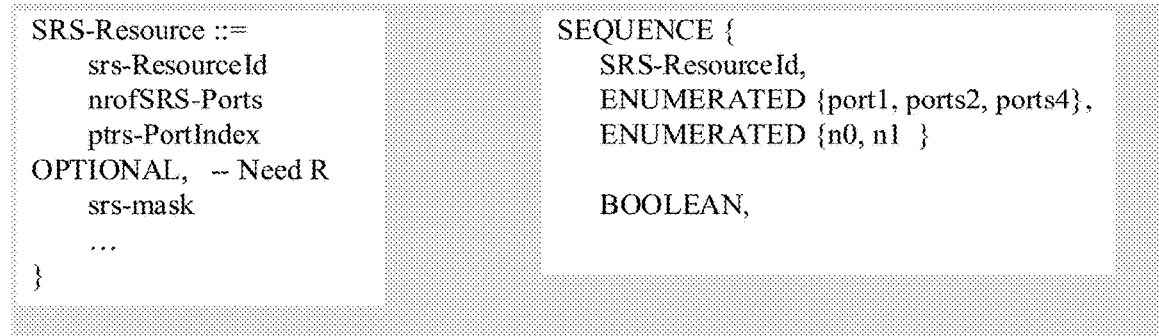
FIG. 7 is a schematic diagram of an indication mark for enabling an SRS mask according to an embodiment of this application.

In addition, not all satellite cells (or satellite beams) need to use a manner of masking the SRS frequency domain sequence to resist impact of a high uplink timing location change rate. The manner of masking the SRS frequency domain sequence can play a greater role in a satellite cell (or satellite beam) near a sub-satellite point and a satellite cell (or satellite beam) near an edge of a coverage area, but may have little effect in another satellite cell (or satellite beam). Therefore, different configuration parameters may be used between satellite cells (or satellite beams) to determine, based on the configuration parameters, whether an SRS mask function is to be enabled: Indication parameters at a satellite cell (or satellite beam) level may be divided, and a mask scrambling manner is not enabled when the parameters are in a specific interval. A parameter division manner is agreed upon between the base station and the terminal, or delivered by the base station in broadcast information. The indication parameters include a Doppler frequency offset value, a common round-trip transmission delay, a common round-trip transmission delay change rate, a beam angle, and the like. These indication parameters are corresponding parameters of a reference point in the satellite cell (or satellite beam), or corresponding parameters of a reference point plus an offset value. Alternatively, one indication mark for enabling an SRS mask may be added to the broadcast information, radio resource control (Radio Resource Control, RRC) information of the target base station, and the like. FIG. 7 is a schematic diagram of an indication mark for enabling an SRS mask according to an embodiment of this application. As shown in FIG. 7, signaling indicating whether to enable an SRS mask may be added to SRS configuration signaling of RRC. Alternatively, signaling indicating whether to enable an SRS mask is added to downlink control information (Downlink Control Information, DCI) or media access control media access control element MAC CE signaling that triggers SRS transmission.

102: The target base station obtains a mask sequence corresponding to the received SRS, and decodes the masked SRS frequency domain sequence based on the mask sequence to obtain frequency domain data in the SRS.

After receiving the signal sent by the terminal, the target base station recovers the SRS frequency domain data, in a same masking manner as that used by the terminal, by aligning c (n) in a local mask sequence set with $M_{ZC}$ subcarriers of the SRS frequency domain sequence one by one.

A form of frequency domain data masking on the terminal side needs to be the same as a form of frequency domain data de-masking on the base station side. Forms of masking and de-masking on a receive end and a transmit end may be agreed manners between the terminal and the base station, or may be manners indicated by the base station. When giving an indication, the base station needs to transmit indication information of the masking form to the terminal through at least one of broadcast information such as a system information block SIB1 (System Information Block Type1), other system information (Other System Information, OSI), and a management information base (MIB, Management Information Base). The base station may use an index number in an index table of indication forms shown in Table 4 to indicate a masking form to the terminal. The index table is agreed between the terminal and the base station, or is delivered by the base station in the broadcast information.

TABLE 4

Index table of indication forms

| Index number | Indication form |
| --- | --- |
| 0 | Masking a real part and an imaginary part of frequency domain data separately |
| 1 | Masking one piece of frequency domain data as a whole |
| ... | ... |
| n | Masking n pieces of frequency domain data as a whole |

103: The target base station tracks an uplink timing location of the terminal device based on the frequency domain data.

After recovering the SRS frequency domain data based on a local mask sequence, the target base station estimates uplink channel quality of the terminal by using the SRS frequency domain data and a corresponding algorithm, and detects parameters such as the uplink timing location and a residual frequency offset value.

Figure 8:
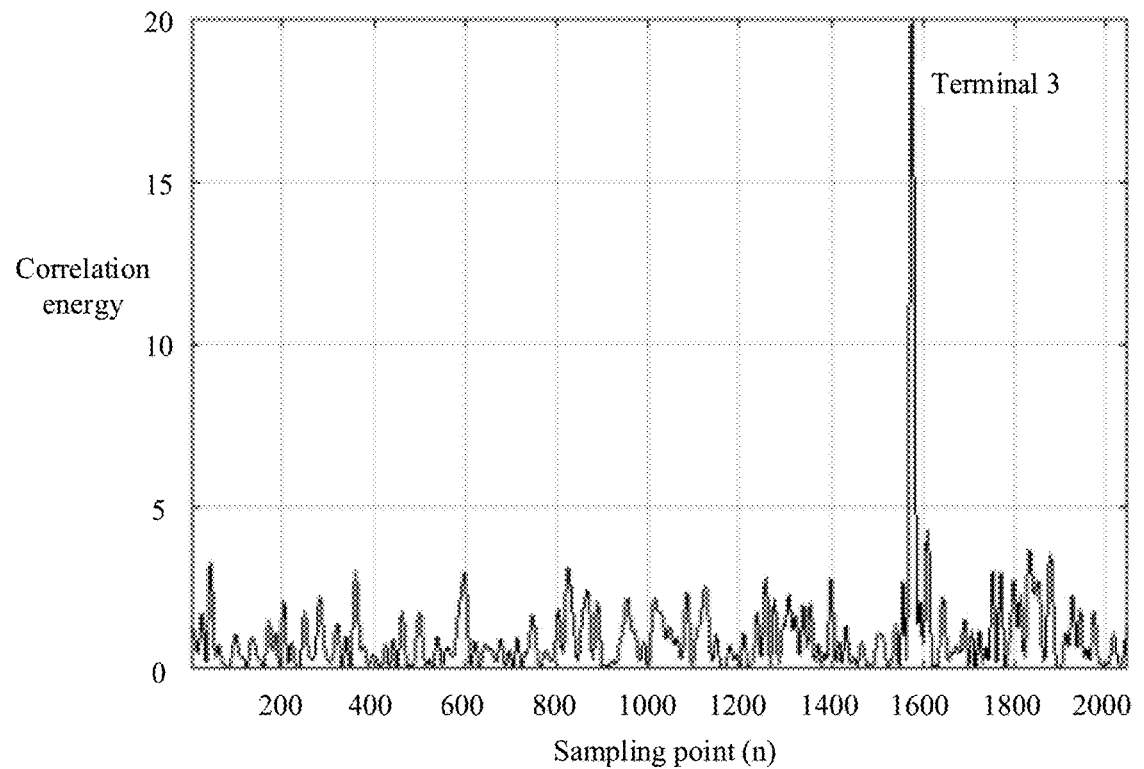
FIG. 8 is a schematic diagram of a multi-user uplink timing location detection result of a masked SRS according to an embodiment of this application.
Figure 9:
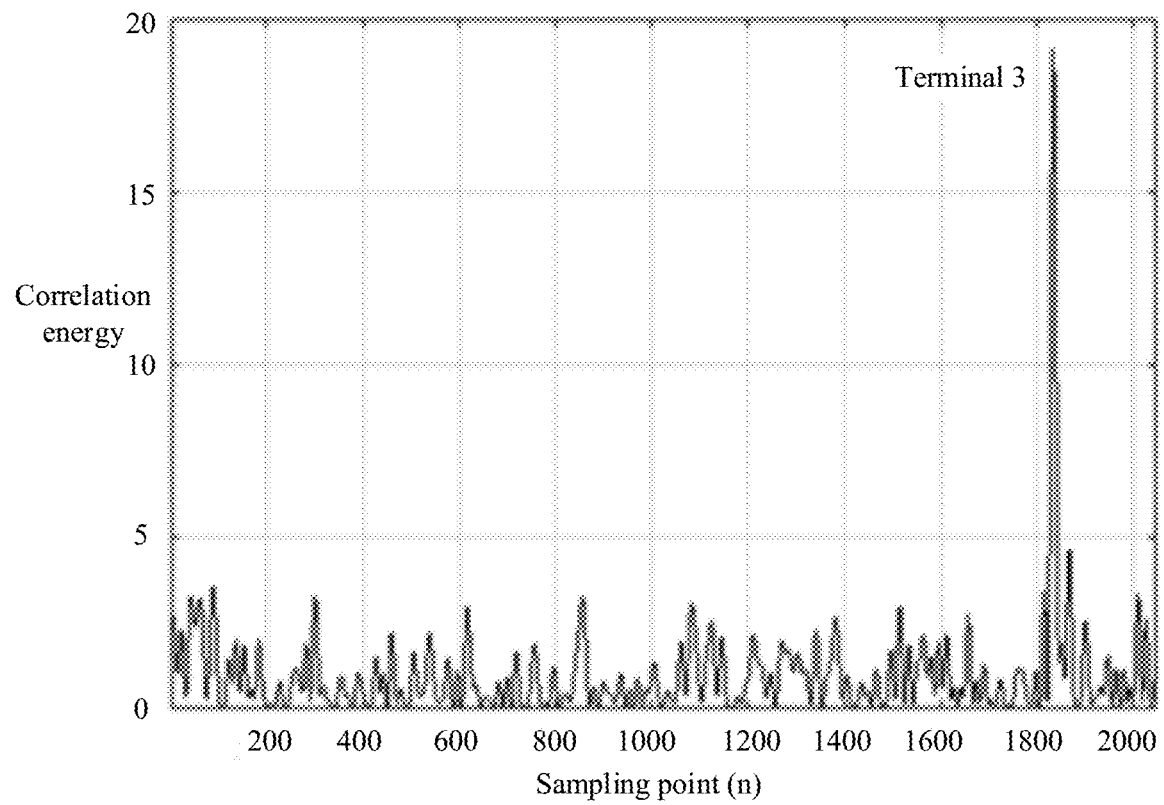
FIG. 9 is another schematic diagram of a multi-user uplink timing location detection result of a masked SRS according to an embodiment of this application.

Specifically, the foregoing example is still used to describe the following situation: After mask scrambling is used, the base station can distinguish between different terminals that transmit, on a same time-frequency resource, SRS sequences generated by different cyclic shifts of a same base sequence. Similarly, it is assumed that the terminal 1 to the terminal 8 transmit, on the same time-frequency resource, SRSs generated by different cyclic shifts of a same base sequence, comb parameters of all terminals are 2, cyclic shift parameters α used by the terminal 1 to the terminal 8 are successively $\{0, 2\pi/8, 2\pi \cdot 2/8, 2\pi \cdot 3/8, 2\pi \cdot 4/8, 2\pi \cdot 5/8, 2\pi \cdot 6/8, 2\pi \cdot 7/8\}$, and the terminals use different mask sequences when scrambling SRS frequency domain sequences. FIG. 8 is a schematic diagram of a multi-user uplink timing location detection result of a masked SRS according to an embodiment of this application. At a moment T0, SRSs sent by terminals arrive at a base station simultaneously. The base station separately performs descrambling by using a mask sequence of each terminal, and detects a peak location of a terminal 3, as shown in FIG. 7 (the terminal 3 is used as an example herein, and a detection result of another terminal is similar to that of the terminal 3). FIG. 9 is another schematic diagram of a multi-user uplink timing location detection result of a masked SRS according to an embodiment of this application. At a moment T1, SRSs sent by terminals for the second time also simultaneously arrive at a base station. The base station separately performs descrambling by using respective mask sequences of different terminals, and detects a peak location of a terminal 3, as shown in FIG. 9 (a detection result of another terminal is similar to that of the terminal 3). Based on the detection results in FIG. 8 and FIG. 9, by scrambling an SRS frequency domain sequence, the base station performs corresponding descrambling processing during detection, so that uplink timing locations of terminals can be distinguished, to extend a detection range of a change of the uplink timing location.

It can be learned that, in this embodiment of this application, in a manner of masking the SRS frequency domain sequence, detectable change ranges of uplink timing locations of terminals that send SRSs by using a same time-frequency resource and different cyclic shift sequences of a same base sequence are extended, and a detectable uplink timing change range of the terminal is extended to one SRS symbol, to meet a timing tracking requirement of a satellite communication system.

Figure 10:
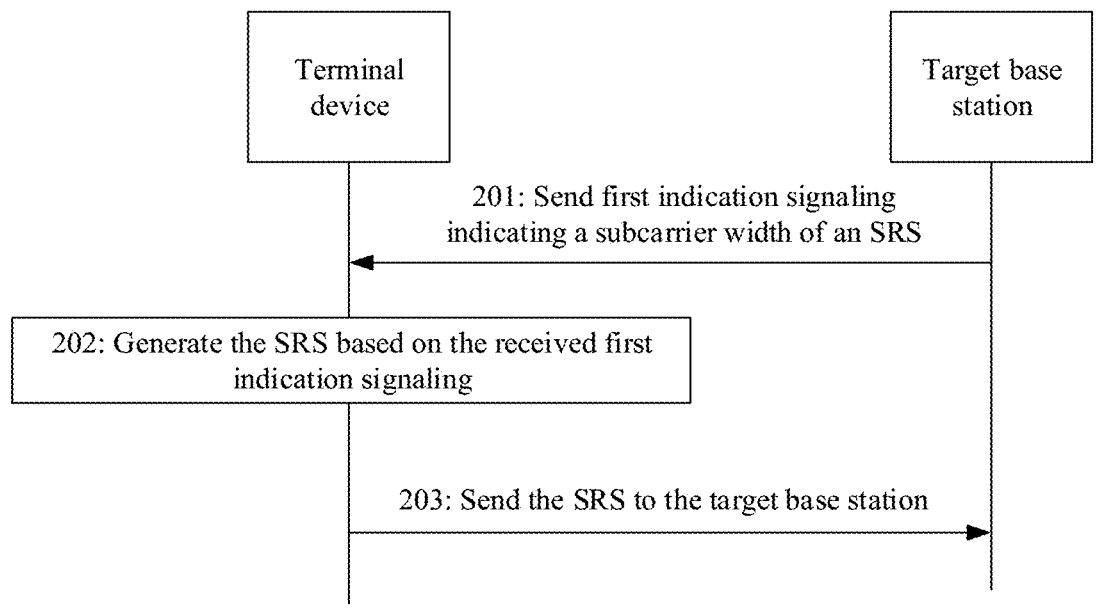
FIG. 10 is a schematic flowchart of another signal sending and processing method according to an embodiment of this application.

FIG. 10 is a schematic flowchart of another signal sending and processing method according to an embodiment of this application. As shown in FIG. 10, the method specifically includes the following steps:

201: A target base station sends first indication signaling indicating a subcarrier width of an SRS to a terminal device.

202: The terminal device generates an SRS based on the received first indication signaling.

203: The terminal device sends the SRS to the target base station.

Generally, BWP configuration signaling of RRC is used to collectively indicate a subcarrier width that is of both uplink data and a reference signal, and a dedicated subcarrier width for an SRS is not supported in a BWP. Because the SRS uses a comb mapping manner in frequency domain, and an actual subcarrier width of the SRS is greater than a width of a data subcarrier, a length of an SRS symbol is shorter than a length of a data symbol, and a measurable timing range is also relatively smaller. To increase the length of the SRS symbol, to extend a detectable change range of an uplink timing location, the SRS may be enabled to select a subcarrier width smaller than a subcarrier width of the data symbol, to increase the detectable change range of the uplink timing location.

Specifically, indication signaling of an SRS subcarrier width may be added to RRC and broadcast information. For example, FIG. 11 is a schematic diagram of indication signaling for setting a subcarrier width according to an embodiment of this application. Indication signaling of an SRS dedicated subcarrier width can be added to a terminal-level SRS parameter configuration (SRS-Config) of RRC signaling.

It can be learned that in this embodiment of this application, a dedicated subcarrier is configured for the SRS by using dedicated indication signaling, so that frequency domain mapping of the SRS is denser, increasing an SRS time domain symbol length and the detectable change range of the uplink timing location.

Figure 12:
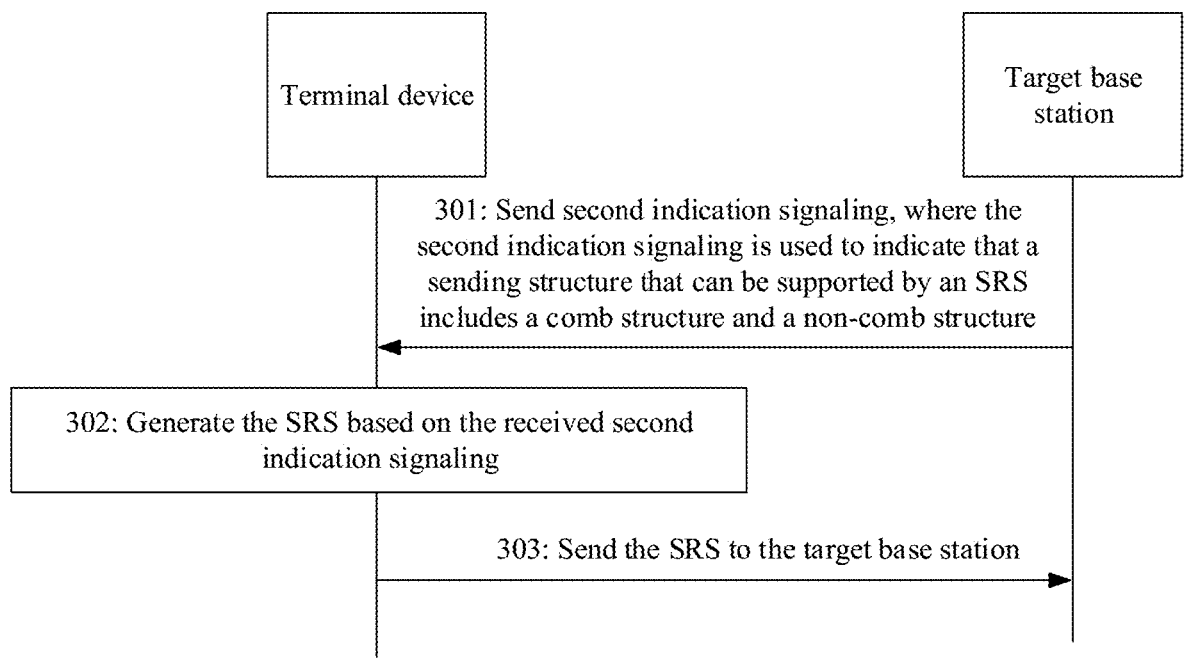
FIG. 12 is a schematic flowchart of another signal sending and processing method according to an embodiment of this application.

FIG. 12 is a schematic flowchart of another signal sending and processing method according to an embodiment of this application. As shown in FIG. 12, the method specifically includes the following steps:

301: A target base station sends second indication signaling to a terminal device, where the second indication signaling is used to indicate that a sending structure that can be supported by an SRS includes a comb structure and a non-comb structure.

302: The terminal device generates the SRS based on the received second indication signaling.

303: The terminal device sends the SRS to the target base station.

Figure 13A:
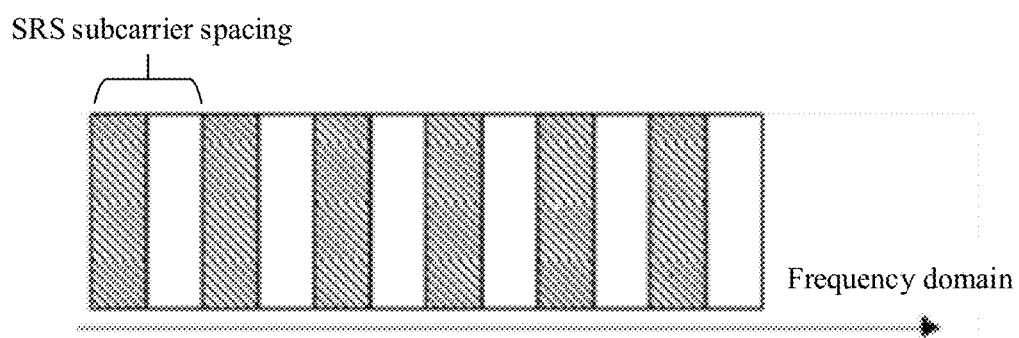
FIG. 13A is a schematic diagram of a subcarrier when a sending comb parameter is 2 according to an embodiment of this application.

In a conventional situation, the SRS is specified to use a comb (Comb) mapping manner in frequency domain. To be specific, for a single terminal device, an SRS is sent every N subcarriers in frequency domain. A sending comb parameter transmissionComb supports a configuration of N=2 or N=4. FIG. 13A is a schematic diagram of a subcarrier when a sending comb parameter is 2 according to an embodiment of this application. As shown in FIG. 13A, each vertical matrix represents one data symbol subcarrier, and one SRS is sent every two subcarriers. The SRS is mapped by using a ½ subcarrier spacing in frequency domain, and one data symbol includes two repeated SRS symbols.

Figures 13B, 14:
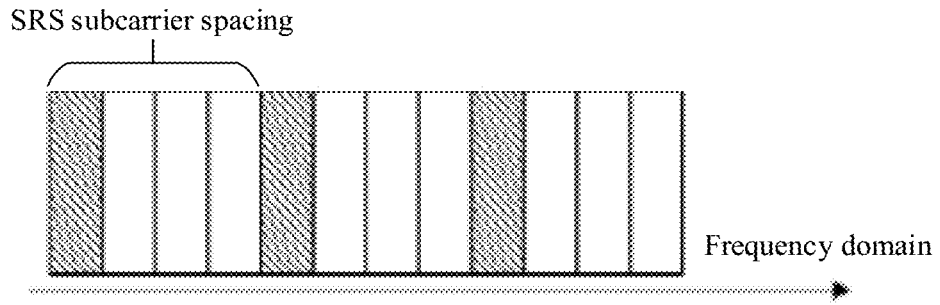
FIG. 13B is another schematic diagram of a subcarrier when a sending comb parameter is 4 according to an embodiment of this application.
FIG. 14 is a schematic diagram of indication signaling for setting that a comb structure is supported according to an embodiment of this application.

Alternatively, FIG. 13B is another schematic diagram of a subcarrier when a sending comb parameter is 4 according to an embodiment of this application. As shown in FIG. 13B, each vertical matrix represents one data symbol subcarrier, and one SRS is sent every four subcarriers. The SRS is mapped by using a ¼ subcarrier spacing in frequency domain, and one data symbol includes four repeated SRS symbols.

In addition, after determining a sending comb density (comb parameter), the terminal device further needs to configure a sending comb offset combOffset, where combOffset-n2 is {0, 1} when N=2, and combOffset-n4 is {0, 1, 2, 3} when N=4. Different terminal devices may configure different comb offset parameters to implement frequency division multiplexing of different subcarriers.

Due to comb structure mapping mentioned above, when a timing location offset detected by the SRS is ½ or ¼ data symbol length, detection ambiguity of a timing point occurs, that is, the target base station cannot determine a timing boundary of an integer number of SRS symbols. To ensure that the base station can still correctly detect a change of a timing location in this case, a length of an SRS symbol may be increased by changing a sending structure of the SRS, so that the base station can detect a larger change range of an uplink timing location by using the SRS.

Specifically, when the SRS supports a comb structure, a setting that the SRS supports a non-comb structure may be added. Indication signaling indicating that the SRS supports the non-comb structure may be added to RRC information and broadcast information. FIG. 14 is a schematic diagram of indication signaling for setting that a comb structure is supported according to an embodiment of this application. As shown in FIG. 14, indication signaling indicating that the SRS supports a non-comb structure Comb n1 may be added to a terminal-level SRS resource configuration (SRS-Resource) of RRC signaling.

It can be learned that in this embodiment of this application, the SRS is enabled to support the non-comb structure, that is, a subcarrier width of the SRS is reduced indirectly, thus increasing an SRS symbol length and a change range of an uplink timing location that a terminal can detect.

Figure 15:
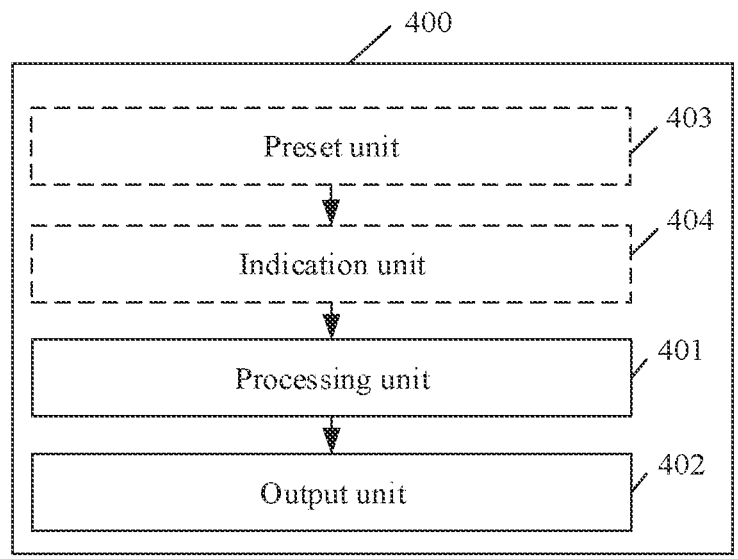
FIG. 15 is a schematic diagram of a structure of a signal sending apparatus according to an embodiment of this application.

FIG. 15 is a schematic diagram of a structure of a signal sending apparatus according to an embodiment of this application. As shown in FIG. 15, the apparatus 400 includes:

a processing unit 401, configured to generate a channel sounding reference signal SRS; and an output unit 402, configured to send the SRS to a target base station, where the target base station can detect, by using the received SRS, that a change range of an uplink timing location of a terminal device that sends the SRS is not less than a length of one SRS symbol.

In a possible example, the SRS is obtained by performing time domain mapping on a masked SRS frequency domain sequence.

In a possible example, the processing unit 401 is configured to generate the masked SRS frequency domain sequence, and is specifically configured to:

multiply an SRS frequency domain sequence by a mask sequence, to generate the masked SRS frequency domain sequence.

In a possible example, the multiplying an SRS frequency domain sequence by a mask sequence includes multiplying one piece of frequency domain data $\tilde{r}_{u,v}^{(\alpha,\delta)}(n)$ in one SRS frequency domain sequence by one element c (n) of the mask sequence, and corresponding formulas are as follows:

$$\tilde{r}_{u,v}^{(\alpha,\delta)}(n)=e^{j\alpha n}\bar{r}_{u,v}(n), 0 \leq n < M_{ZC}$$

$$r_{u,v}^{(\alpha,\delta)}(n)=c(n)\cdot\tilde{r}_{u,v}^{(\alpha,\delta)}(n), 0 \leq n < M_{ZC}$$

where $r_{u,v}^{(\alpha,\delta)}(n)$ represents one piece of frequency domain data in the masked SRS frequency domain sequence, and $M_{ZC}$ is a length of the SRS frequency domain sequence.

In a possible example, the apparatus further includes a preset unit 403, configured to:

before the channel sounding reference signal SRS is generated, obtain a preset masking form, and determine, based on the preset masking form, a location for masking in the SRS frequency domain sequence.

In a possible example, the obtaining a preset masking form includes:

obtaining an index number, and reading a masking form retrieval table based on the index number, where the masking form retrieval table includes index numbers and masking forms corresponding to the index numbers; and determining the preset masking form based on a reading result.

In a possible example, the mask sequence is a first mask sequence generated based on a base station related parameter and a first SRS related parameter, and the base station related parameter is a related parameter of a satellite cell or a satellite beam corresponding to the target base station.

In a possible example, the mask sequence is a second mask sequence generated based on a terminal device related parameter and a first SRS related parameter, and the terminal device related parameter includes a cell radio network temporary identifier of the terminal device.

In a possible example, the mask sequence is a third mask sequence generated based on a first SRS related parameter and a second SRS related parameter, and the second SRS related parameter is used to indicate a time-frequency resource of the SRS.

In a possible example, the apparatus further includes an indication unit 404, configured to:

before the channel sounding reference signal SRS is generated, obtain an indication parameter of a target base station to which the terminal device needs to send the SRS, where the indication parameter is used to represent a type of a satellite cell or a satellite beam corresponding to the target base station; and determine that the indication parameter is within an interval of a maskable parameter value.

In a possible example, in terms of generating the channel sounding reference signal SRS, the processing unit 401 is specifically configured to:

obtain first indication signaling indicating a subcarrier width of the SRS; and generate the SRS based on the first indication signaling.

In a possible example, the processing unit 401 is specifically configured to:

obtain second indication signaling related to a sending structure that can be supported by the SRS, where the second indication signaling is used to indicate that the sending structure that can be supported by the SRS includes a comb structure and a non-comb structure; and generate the SRS based on the second indication signaling.

Figure 16:
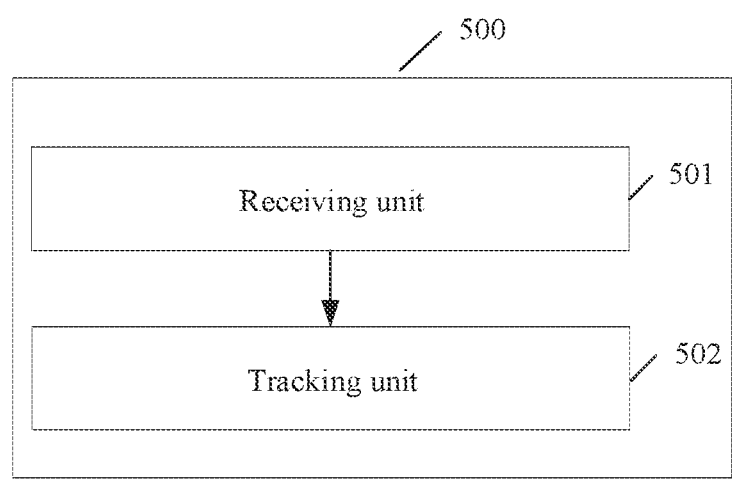
FIG. 16 is a schematic diagram of a structure of a signal processing apparatus according to an embodiment of this application.

FIG. 16 is a schematic diagram of a structure of a signal processing apparatus according to an embodiment of this application. As shown in FIG. 16, the apparatus 500 includes: a receiving unit 501, configured to receive an SRS sent by a terminal device; and a tracking unit 502, configured to track an uplink timing location of the terminal device based on the SRS, where a change range of the uplink timing location is not less than a length of one SRS symbol.

In an optional example, the SRS is obtained by performing time domain mapping on a masked SRS frequency domain sequence, and the tracking unit 502 is specifically configured to:

obtain a mask sequence corresponding to the SRS, and decode the masked SRS frequency domain sequence based on the mask sequence to obtain frequency domain data in the SRS; and track the uplink timing location of the terminal device based on the frequency domain data.

In an optional example, before obtaining the mask sequence corresponding to the SRS, the tracking unit is further configured to:

obtain a preset masking form, and determine, based on the preset masking form, a location for decoding the SRS.

In an optional example, before receiving the SRS sent by the terminal device, the receiving unit 501 is further configured to:

send first indication signaling to the terminal device, where the first indication signaling is used to indicate a subcarrier width of the SRS.

In an optional example, before receiving the SRS sent by the terminal device, the receiving unit 501 is further configured to:

send second indication signaling to the terminal device, where the second indication signaling is used to indicate that a sending structure that can be supported by the SRS includes a comb structure and a non-comb structure.

It should be noted that the processing unit 401 and the output unit 402 are configured to perform related steps on a terminal device side in the foregoing method steps 101 to 103, 201 to 203, and 301 to 303. The receiving unit 501 and the tracking unit 502 are configured to perform related steps on a target base station side in the foregoing method steps 101 to 103, 201 to 203, and 301 to 303.

In this embodiment, the apparatus 400 and the apparatus 500 are presented in a unit form. The "unit" herein may be an application-specific integrated circuit (application-specific integrated circuit, ASIC), a processor and a memory that execute one or more software or firmware programs, an integrated logic circuit, and/or another device that can provide the foregoing functions.

Figure 17:
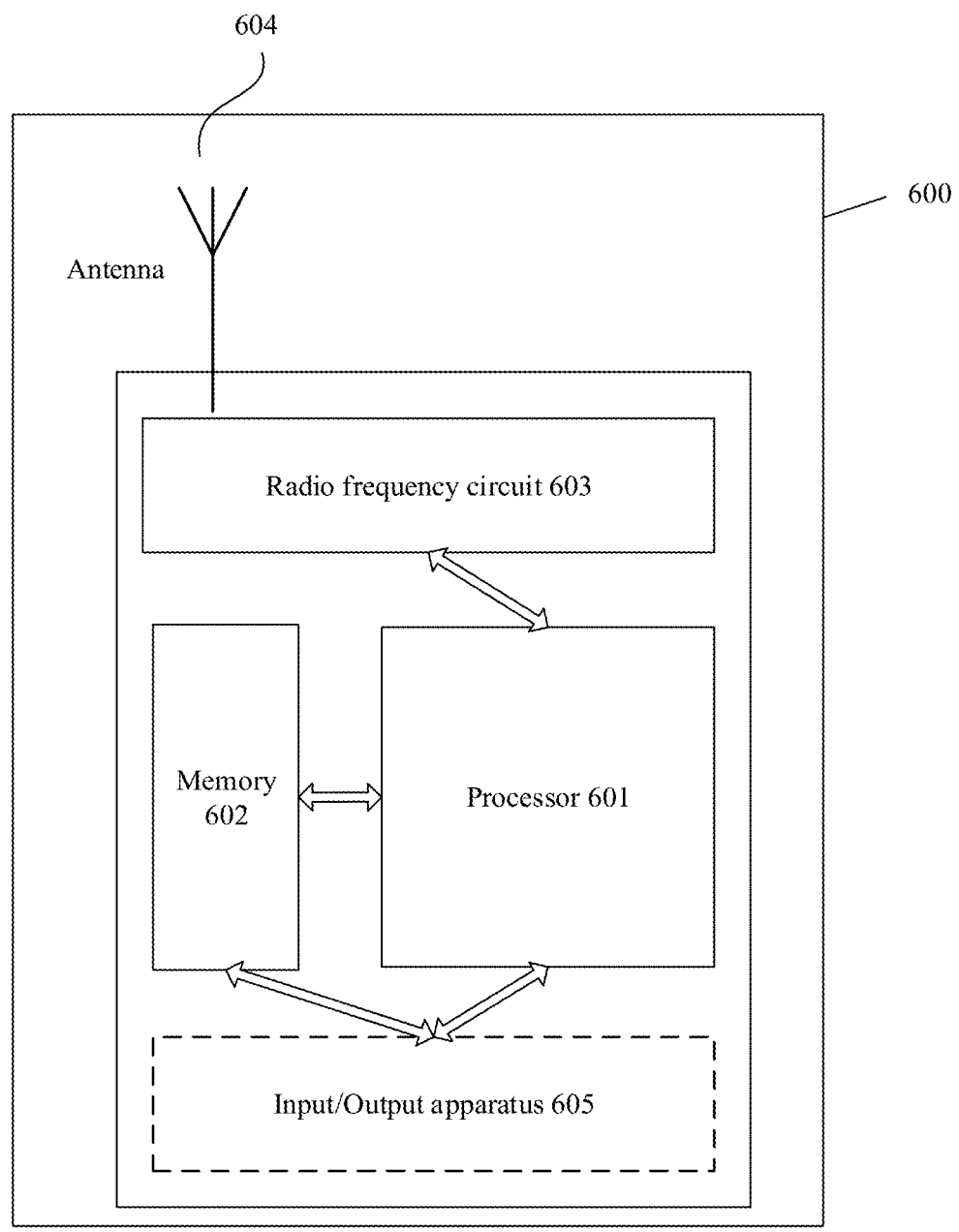
FIG. 17 is a schematic diagram of a structure of an apparatus according to an embodiment of this application.

As shown in FIG. 17, the apparatus 400 may be implemented in a structure in FIG. 17. The apparatus 600 includes at least one processor 601 and at least one memory 602, and may further include a radio frequency circuit 603, an antenna 604, and an input/output apparatus 605. For example, the processor 601 may be configured to process a communication protocol and communication data, and may be further configured to: control the terminal device, execute software programs, process data of the software programs, and the like. The terminal device may further include a memory 602. The memory 602 is mainly configured to store the software programs and data. These involved programs may be loaded into the memory at delivery of the communication apparatus, or may be loaded into the memory when needed later. The radio frequency circuit 603 is mainly configured to: perform conversion between a baseband signal and a radio frequency signal, and process the radio frequency signal. The antenna 604 is mainly configured to receive and send a radio frequency signal in a form of an electromagnetic wave. The input/output apparatus, such as a touchscreen, a display screen, or a keyboard, is mainly configured to: receive data entered by a user, and output data to the user. It should be noted that some types of terminal devices may not have the input/output apparatus.

When data needs to be sent, the processor performs baseband processing on the to-be-sent data, and then outputs a baseband signal to the radio frequency circuit. After performing radio frequency processing on the baseband signal, the radio frequency circuit sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 17 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

The processor 601 may be a general-purpose central processing unit (CPU), a microprocessor, an application-specific integrated circuit (application-specific integrated circuit, ASIC), or one or more integrated circuits for controlling program execution of the foregoing solutions.

The memory 602 may be a read-only memory (read-only memory, ROM) or another type of static storage device that can store static information and instructions, or a random access memory (random access memory, RAM) or another type of dynamic storage device that can store information and instructions; or may be an electrically erasable programmable read-only memory (Electrically Erasable Programmable Read-Only Memory, EEPROM), a compact disc read-only memory (Compact Disc Read-Only Memory, CD-ROM) or other optic disk storage, optical disc storage (including a compact disc, a laser disc, an optical disc, a digital general-purpose optical disc, a Blu-ray optical disc, or the like), or magnetic disk storage media or other magnetic storage devices, or any other medium that can be accessed by a computer and that can be used to carry or store expected program code in an instruction form or in a data structure form, but this is not limited thereto. The memory may exist independently, and is connected to the processor through a bus. The memory may alternatively be integrated with the processor.

The memory 602 is configured to store application program code for executing the foregoing solutions, and the processor 601 controls the execution. The processor 601 is configured to execute the application program code stored in the memory 602.

The code stored in the memory 602 may perform the signal processing method provided above, which includes: generating a channel sounding reference signal SRS; sending the SRS to a target base station, where the target base station can detect, by using the received SRS, that a change range of an uplink timing location of a terminal device that sends the SRS is not less than a length of one SRS symbol.

Figure 18:
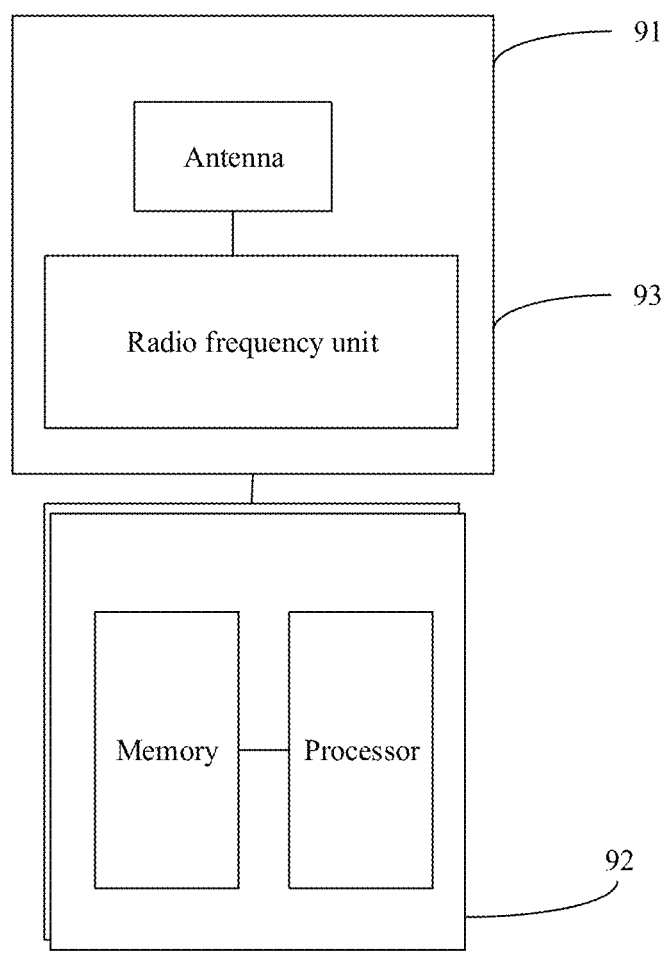
FIG. 18 is a schematic diagram of a structure of a network device according to an embodiment of this application.

FIG. 18 is a simplified schematic diagram of a structure of a network device. The network device includes a part 92 and a part for radio frequency signal sending/receiving and conversion. The part for radio frequency signal sending/receiving and conversion further includes a receiving unit part 91 and a sending unit part 93 (which may also be collectively referred to as a transceiver unit). The part for radio frequency signal sending/receiving and conversion is mainly configured to: send and receive a radio frequency signal and perform conversion between a radio frequency signal and a baseband signal. The part 92 is mainly configured to: perform baseband processing and control the network device. The receiving unit 91 may also be referred to as a receiver machine, a receiver, a receiver circuit, or the like. The sending unit 93 may also be referred to as a transmitter machine, a transmitter, a sender, a transmitter circuit, or the like. The part 92 is usually a control center of the network device, usually may be referred to as a processing unit, and is configured to control the network device to perform the steps performed by the target base station in FIG. 4, FIG. 10, and FIG. 12 described above. For details, refer to the descriptions of the foregoing related parts.

The part 92 may include one or more boards. Each board may include one or more processors and one or more memories. The processor is configured to read and execute a program in the memory to implement a baseband processing function and control the network device. If there are a plurality of boards, the boards may be interconnected to improve a processing capability. In an optional implementation, a plurality of boards may share one or more processors, a plurality of boards may share one or more memories, or a plurality of boards may simultaneously share one or more processors.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

An embodiment of this application further provides a computer storage medium. The computer storage medium may store a program. When the program is executed, some or all of the steps of any data transmission rate adjustment method described in the foregoing method embodiments are performed.

An embodiment of this application further provides a computer program product including computer program code. When running on a computer, the computer program code enables the computer to perform the method in FIG. 4, FIG. 10, and FIG. 12.

It should be noted that, for ease of description, the foregoing method embodiments are expressed as a series of actions. However, a person skilled in the art should know that this application is not limited to the described action sequence, because according to this application, some steps may be performed in other sequences or performed simultaneously. In addition, a person skilled in the art should also know that all the embodiments described in the specification are embodiments, and the related actions and modules are not necessarily mandatory to this application.

In the foregoing embodiments, the descriptions of each embodiment have respective focuses. For a part that is not described in detail in an embodiment, refer to related descriptions in other embodiments.

In the several embodiments provided in this application, it should be understood that the disclosed apparatuses may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of this application essentially, or the part contributing to the conventional technology, or all or some of the technical solutions may be implemented in the form of a software product. The computer software product is stored in a memory and includes several instructions for instructing a computer device (which may be a personal computer, a server, a network device, or the like) to perform all or some of the steps of the methods described in the embodiments of this application. The foregoing memory includes any medium that can store program code, for example, a USB flash drive, a read-only memory (ROM, Read-Only Memory), a random access memory (RAM, Random Access Memory), a removable hard disk, a magnetic disk, or an optical disc.

A person of ordinary skill in the art may understand that all or some of the steps of the methods in the embodiments may be implemented by a program instructing related hardware. The program may be stored in a computer-readable memory. The memory may include a flash memory, a read-only memory (English: Read-Only Memory, ROM for short), a random access memory (English: Random Access Memory, RAM for short), a magnetic disk, an optical disc, or the like.

The embodiments of this application are described in detail above. The principle and implementations of this application are described in this specification by using specific examples. The descriptions about the embodiments are merely provided to help understand the method and core ideas of this application. In addition, a person of ordinary skill in the art makes variations to this application in terms of the specific implementations and application scopes based on the ideas of this application. Therefore, the content of this specification shall not be construed as a limitation on this application.

What is claimed is:

1. A signal sending method, comprising:
generating, by a terminal device, a masked sounding reference signal (SRS) frequency domain sequence based on multiplying an SRS frequency domain sequence by a mask sequence, wherein multiplying the SRS frequency domain sequence by the mask sequence comprises multiplying one piece of frequency domain data $\tilde{r}_{u,v}^{(\alpha,\delta)}(n)$ in one SRS frequency domain sequence by one element c(n) of the mask sequence based on:

$$\tilde{r}_{u,v}^{(\alpha,\delta)}(n) = e^{j\alpha n}\bar{r}_{u,v}(n), 0 \leq n < M_{ZC}$$

$$r_{u,v}^{(\alpha,\delta)}(n) = c(n) \cdot \tilde{r}_{u,v}^{(\alpha,\delta)}(n), 0 \leq n < M_{ZC}$$

wherein $r_{u,v}^{(\alpha,\delta)}(n)$ represents one piece of frequency domain data in the masked SRS frequency domain sequence, and $M_{ZC}$ is a length of the SRS frequency domain sequence;
generating, by the terminal device, a channel SRS based on performing time domain mapping on the masked SRS frequency domain sequence; and
sending, by the terminal device, the SRS to a target base station, wherein the target base station detects, by using the SRS, that a change range of an uplink timing location of the terminal device is not less than a length of one SRS symbol.

2. The method according to claim 1, wherein before generating the channel SRS, the method further comprises:
obtaining a preset masking form; and
determining, based on the preset masking form, a location for masking in a SRS frequency domain sequence.

3. The method according to claim 2, wherein obtaining the preset masking form comprises:
obtaining an index number;
reading a masking form retrieval table based on the index number, wherein the masking form retrieval table comprises index numbers and masking forms corresponding to the index numbers; and
determining the preset masking form based on a reading result.

4. The method according to claim 1, wherein the mask sequence is a first mask sequence generated based on a base station related parameter and a first SRS related parameter, and the base station related parameter is a related parameter of a satellite cell or a satellite beam corresponding to the target base station.

5. The method according to claim 1, wherein the mask sequence is a second mask sequence generated based on a terminal device related parameter and a first SRS related parameter, and the terminal device related parameter comprises a cell radio network temporary identifier of the terminal device.

6. The method according to claim 1, wherein the mask sequence is a third mask sequence generated based on a first SRS related parameter and a second SRS related parameter, and the second SRS related parameter indicates a time-frequency resource of the SRS.

7. The method according to claim 1, wherein before generating the channel SRS, the method further comprises:
obtaining an indication parameter of the target base station, wherein the indication parameter represents a type of a satellite cell or a satellite beam corresponding to the target base station; and
determining that the indication parameter is within an interval of a maskable parameter value.

8. The method according to claim 1, wherein generating the channel SRS comprises:
obtaining first indication signaling indicating a subcarrier width of the SRS; and
generating the SRS based on the first indication signaling.

9. The method according to claim 1, wherein generating the channel SRS comprises:
obtaining second indication signaling related to a sending structure supported by the SRS, wherein the second indication signaling indicates that the sending structure comprises a comb structure and a non-comb structure; and
generating the SRS based on the second indication signaling.

10. A signal processing method, comprising:
receiving a sounding reference signal (SRS) sent by a terminal device, wherein the SRS is generated based on performing time domain mapping on a masked SRS frequency domain sequence, and wherein the masked SRS frequency domain sequence is generated based on multiplying an SRS frequency domain sequence by a mask sequence, wherein multiplying the SRS frequency domain sequence by the mask sequence comprises multiplying one piece of frequency domain data $\tilde{r}_{u,v}^{(\alpha,\delta)}(n)$ in one SRS frequency domain sequence by one element c(n) of the mask sequence based on:

$$\tilde{r}_{u,v}^{(\alpha,\delta)}(n) = e^{j\alpha n}\bar{r}_{u,v}(n), 0 \leq n < M_{ZC}$$

$$r_{u,v}^{(\alpha,\delta)}(n) = c(n) \cdot \tilde{r}_{u,v}^{(\alpha,\delta)}(n), 0 \leq n < M_{ZC}$$

wherein $r_{u,v}^{(\alpha,\delta)}(n)$ represents one piece of frequency domain data in the masked SRS frequency domain sequence, and $M_{ZC}$ is a length of the SRS frequency domain sequence; and
tracking an uplink timing location of the terminal device based on the SRS, wherein a change range of the uplink timing location is not less than a length of one SRS symbol.

11. The method according to claim 10, wherein tracking the uplink timing location of the terminal device based on the SRS comprises:
obtaining the mask sequence corresponding to the SRS;
decoding the masked SRS frequency domain sequence based on the mask sequence to obtain frequency domain data in the SRS; and
tracking the uplink timing location of the terminal device based on the frequency domain data.

12. The method according to claim 11, wherein before obtaining the mask sequence corresponding to the SRS, the method further comprises:
obtaining a preset masking form; and
determining, based on the preset masking form, a location for decoding the SRS.

13. The method according to claim 10, wherein before receiving the SRS sent by the terminal device, the method further comprises:
sending first indication signaling to the terminal device, wherein the first indication signaling indicates a sub-carrier width of the SRS.

14. The method according to claim 10, wherein before receiving the SRS sent by the terminal device, the method further comprises:
sending second indication signaling to the terminal device, wherein the second indication signaling indicates that a sending structure supported by the SRS comprises a comb structure and a non-comb structure.

15. A communication apparatus, comprising:
at least one processor; and
one or more memories coupled to the at least one processor and storing programming instructions for execution by the at least one processor to:
generate a masked sounding reference signal (SRS) frequency domain sequence based on multiplying an SRS frequency domain sequence by a mask sequence, wherein multiplying the SRS frequency domain sequence by the mask sequence comprises multiplying one piece of frequency domain data $\tilde{r}_{u,v}^{(\alpha,\delta)}(n)$ in one SRS frequency domain sequence by one element c(n) of the mask sequence based on:

$$\tilde{r}_{u,v}^{(\alpha,\delta)}(n) = e^{j\alpha n}\bar{r}_{u,v}(n), 0 \leq n < M_{ZC}$$

$$r_{u,v}^{(\alpha,\delta)}(n) = c(n) \cdot \tilde{r}_{u,v}^{(\alpha,\delta)}(n), 0 \leq n < M_{ZC}$$

wherein $r_{u,v}^{(\alpha,\delta)}(n)$ represents one piece of frequency domain data in the masked SRS frequency domain sequence, and $M_{ZC}$ is a length of the SRS frequency domain sequence;
generate a channel SRS based on performing time domain mapping on the masked SRS frequency domain sequence; and
send the SRS to a target base station, wherein the target base station detects, by using the SRS, that a change range of an uplink timing location of the communication apparatus is not less than a length of one SRS symbol.

16. The communication apparatus according to claim 15, wherein before generating the channel SRS, the programming instructions are for execution by the at least one processor to:
obtain a preset masking form; and
determine, based on the preset masking form, a location for masking in a SRS frequency domain sequence.

17. The communication apparatus according to claim 16, wherein obtaining the preset masking form comprises:
obtaining an index number;
reading a masking form retrieval table based on the index number, wherein the masking form retrieval table comprises index numbers and masking forms corresponding to the index numbers; and
determining the preset masking form based on a reading result.

18. The communication apparatus according to claim 15, wherein the mask sequence is a first mask sequence generated based on a base station related parameter and a first SRS related parameter, and the base station related parameter is a related parameter of a satellite cell or a satellite beam corresponding to the target base station.

* * * * *